United States Patent
Yoshida

(10) Patent No.: US 10,928,694 B2
(45) Date of Patent: Feb. 23, 2021

(54) ACTIVE MATRIX SUBSTRATE AND LIQUID CRYSTAL DISPLAY DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/485,826

(22) PCT Filed: Feb. 13, 2018

(86) PCT No.: PCT/JP2018/004860
§ 371 (c)(1),
(2) Date: Aug. 14, 2019

(87) PCT Pub. No.: WO2018/151085
PCT Pub. Date: Aug. 23, 2018

(65) Prior Publication Data
US 2020/0050069 A1 Feb. 13, 2020

(30) Foreign Application Priority Data
Feb. 20, 2017 (JP) .............................. JP2017-029147

(51) Int. Cl.
*G02F 1/1362* (2006.01)
*G02F 1/1368* (2006.01)
*G02F 1/1343* (2006.01)

(52) U.S. Cl.
CPC ...... *G02F 1/136286* (2013.01); *G02F 1/1368* (2013.01); *G02F 1/13439* (2013.01);
(Continued)

(58) Field of Classification Search
CPC ........... G02F 1/136286; G02F 1/13439; G02F 1/136209; G02F 1/136213;
(Continued)

(56) References Cited

U.S. PATENT DOCUMENTS

2008/0024709 A1* 1/2008 Moon .................. G09G 3/3677
349/139
2012/0138922 A1 6/2012 Yamazaki et al.
(Continued)

FOREIGN PATENT DOCUMENTS

| JP | 2008-033324 A | 2/2008 |
|---|---|---|
| JP | 2012-134475 A | 7/2012 |

(Continued)

*Primary Examiner* — Angela K Davison
(74) *Attorney, Agent, or Firm* — Keating & Bennett, LLP

(57) ABSTRACT

An active matrix substrate includes a plurality of pixels, a plurality of gate bus lines each extending in a first direction and a plurality of source bus lines each extending in a second direction different from the first direction. The plurality of pixels constitute a plurality of color display pixels, and each of the plurality of color display pixels includes at least three pixels adjacent to one another in the second direction. Each of the plurality of pixels has at least one recess including a hole formed in an interlayer insulating layer, a first transparent electrode formed in the at least one recess, and a second transparent electrode electrically connected to a first drain electrode. The second transparent electrode is formed along a side surface and a bottom surface of the at least one recess to be opposite the first transparent electrode with an inorganic insulating layer interposed therebetween.

20 Claims, 27 Drawing Sheets

(52) U.S. Cl.
CPC .. *G02F 1/134336* (2013.01); *G02F 1/134363* (2013.01); *G02F 1/136209* (2013.01); *G02F 1/136213* (2013.01); *G02F 1/136227* (2013.01)

(58) Field of Classification Search
CPC ............. G02F 1/136227; G02F 1/1368; G02F 2001/134372; G02F 2001/134381
See application file for complete search history.

(56) References Cited

U.S. PATENT DOCUMENTS

| | | | |
|---|---|---|---|
| 2013/0300968 A1* | 11/2013 | Okajima | H01L 29/78633 |
| | | | 349/43 |
| 2013/0320334 A1 | 12/2013 | Yamazaki et al. | |
| 2014/0286076 A1 | 9/2014 | Aoki et al. | |
| 2015/0185578 A1* | 7/2015 | Hirosawa | G02F 1/133707 |
| | | | 349/43 |
| 2016/0223873 A1* | 8/2016 | Shin | G02F 1/134309 |
| 2016/0266456 A1* | 9/2016 | Park | G02F 1/134309 |

FOREIGN PATENT DOCUMENTS

| | | |
|---|---|---|
| JP | 2014-007399 A | 1/2014 |
| JP | 2014-209727 A | 11/2014 |

* cited by examiner

FIG. 6
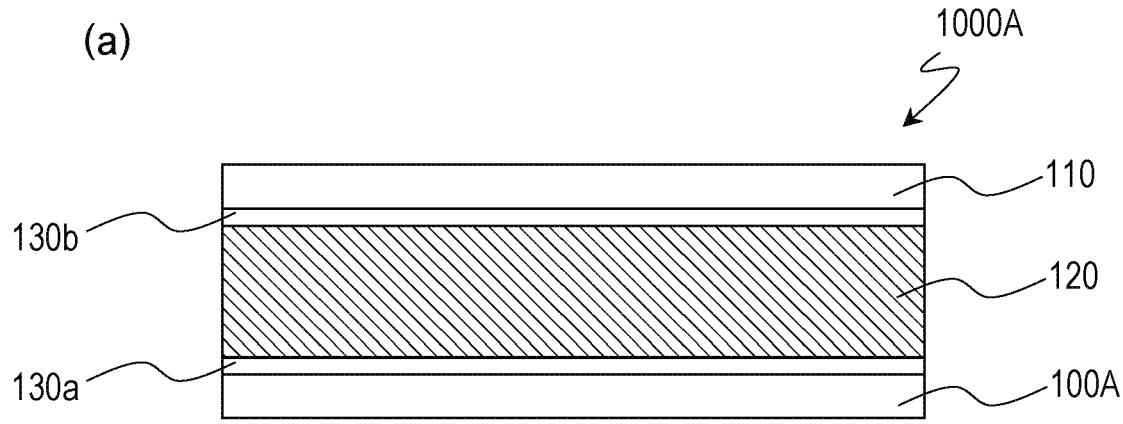
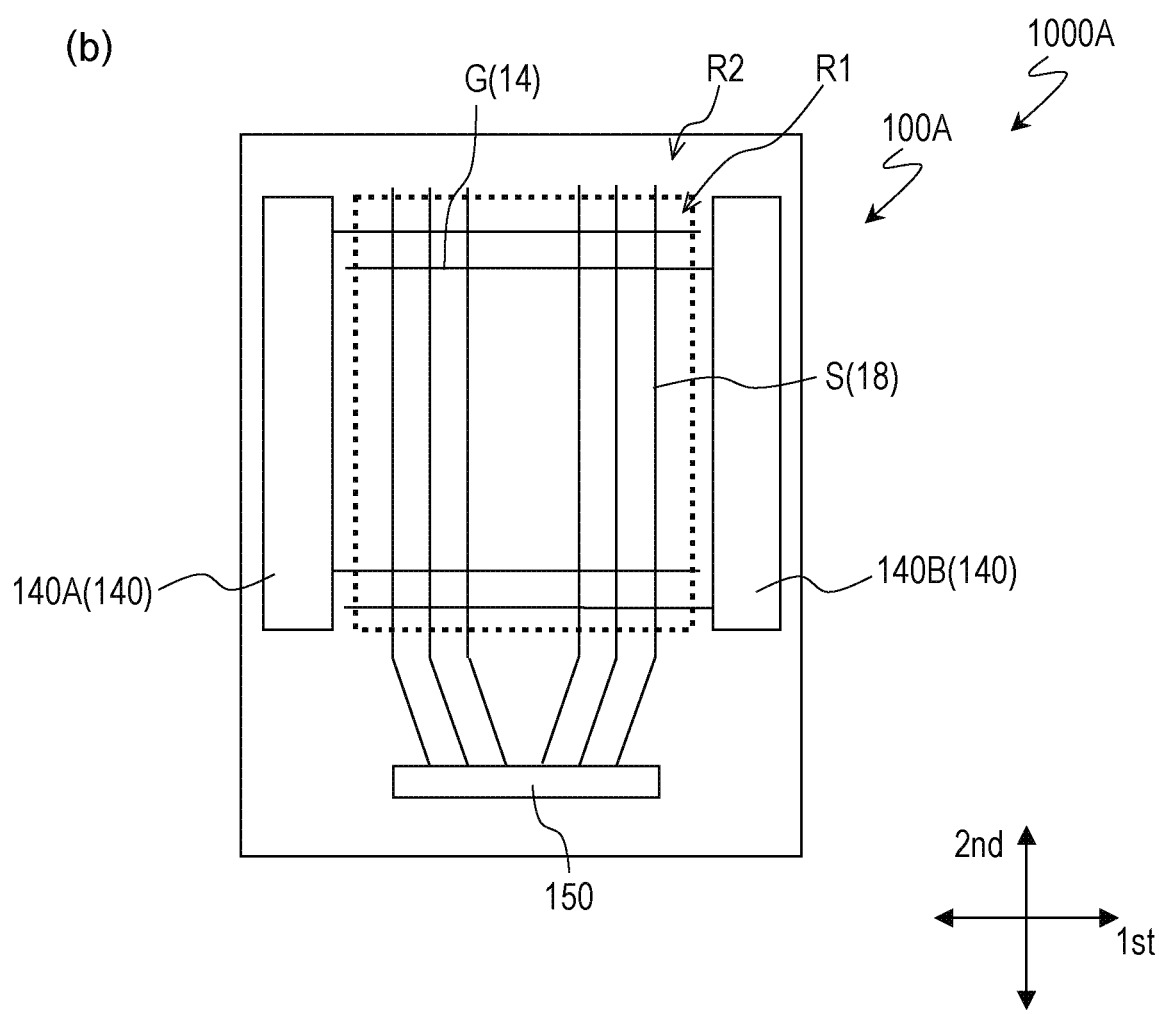

FIG. 10
(a)
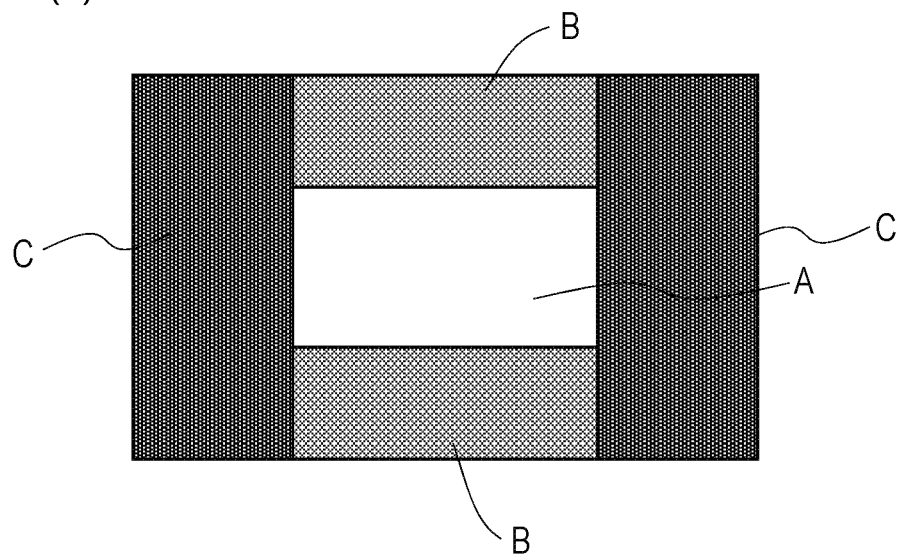
(b)
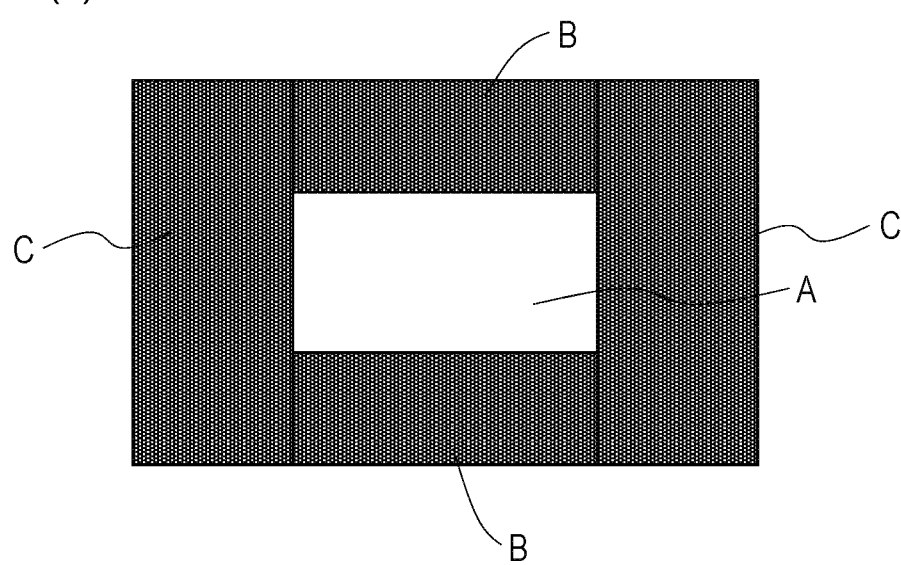

ACTIVE MATRIX SUBSTRATE AND LIQUID CRYSTAL DISPLAY DEVICE

TECHNICAL FIELD

The present invention relates to an active matrix substrate and a liquid crystal display device including the active matrix substrate.

BACKGROUND ART

A liquid crystal display device including an active matrix substrate is currently used in various applications. In recent years, high resolution of an active-matrix liquid crystal display apparatus has been advanced. In addition, a demand for a picture-frame narrowing and a manufacturing cost reduction is also increasing.

The liquid crystal display device including the active matrix substrate has a plurality of pixels arranged in a matrix having a plurality of rows and a plurality of columns, and on the active matrix substrate, a switching element (for example, a thin film transistor (TFT)) is provided for each pixel. Typically, the active-matrix liquid crystal display apparatus has a configuration that one gate bus line (a scanning line) is provided for each pixel row, and one source bus line (a signal line) is provided for each pixel column. Each gate bus line is supplied with a scan signal voltage (also referred to as a gate signal voltage) from a gate drive circuit (hereinafter, referred to as a "gate driver"), and each source bus line is supplied with a display signal voltage (also referred to as a source signal voltage or a gray-scale voltage) from a source drive circuit (hereinafter referred to as a "source driver").

In general, since the source driver is more expensive than the gate driver, by reducing the number of source drivers, the manufacturing cost of the liquid crystal display device can be reduced. In a typical liquid crystal display device in the related art, one color display pixel is constituted by three pixels which display red (R), green (G), and blue (B) which are three primary colors of light, and the one color display pixel is constituted by R, G, and B pixels arranged in a row direction. That is, an R pixel column, a G pixel column, and a B pixel column are arranged in a stripe shape, and different colors are displayed for each pixel column. In this case, assuming that the number of color display pixels included in the liquid crystal display device is x rows×y columns, the number of pixels is x rows×(3×y) columns. Here, the color display pixel may be called a pixel or a dot.

In contrast, PTL 1 discloses a liquid crystal display device in which one color display pixel is constituted by R, G, and B pixels arranged in a column direction. Such a configuration is referred to herein as a "triple gate structure" in the present specification. In this case, assuming that in the liquid crystal display device having the triple gate structure, the number of color display pixels is x rows×y columns, the number of pixels is (3×x) rows× y columns. The number of pixel rows is tripled and the number of pixel columns is reduced to one third as compared with the liquid crystal display device in the related art. Assuming that one gate bus line is provided for each pixel row and one source bus line is provided for each pixel column, although the number of gate bus lines is tripled as compared with the liquid crystal display device in the related art, the number of source bus lines can be reduced to one third. Therefore, the number of source drivers can be reduced. By reducing the number of source drivers, in addition to the reduction of the manufacturing cost of the liquid crystal display device, it is possible to realize a picture-frame narrowing and a downsizing of the liquid crystal display device.

In the specification of the present application, the "triple gate structure" may be used to indicate a configuration of the active matrix substrate included in the liquid crystal display device.

CITATION LIST

Patent Literature

PTL 1: Japanese Unexamined Patent Application Publication No. 2008-33324

SUMMARY OF INVENTION

Technical Problem

When a triple gate structure is applied to a high resolution liquid crystal display device, a display quality may not be sufficiently obtained.

As the high resolution of the liquid crystal display device has been advanced, a charging time for each pixel becomes short. In addition, as each pixel becomes small, a capacitance value of a parasitic capacitance with respect to a capacitance value of a pixel capacitor relatively increases. This is because, for example, when a switching element is enlarged to compensate for the short charging time, an electrode constituting the switching element is enlarged, and thus the parasitic capacitance increases. When the triple gate structure is applied, the number of gate bus lines increases. Accordingly, the charging time for each pixel becomes further shorter (for example, about one third), and the capacitance value of the parasitic capacitance with respect to the capacitance value of the pixel capacitor further increases. As described above, in the high resolution liquid crystal display device having the triple gate drive structure, a flicker or a shadowing easily occurs. Details will be described below.

Further, the problem that the flicker or the shadowing easily occurs is not limited to the liquid crystal display device having the triple gate structure. The similar problem may occur in a liquid crystal display device in which one color display pixel is constituted by four or more pixels arranged in a column direction.

The present invention has been made in view of the above problems, and an object thereof is to provide an active matrix substrate capable of improving a display quality while suppressing a decrease in aperture ratio of a liquid crystal display device having a plurality of pixels in which color display pixels are arranged in a column direction.

Solution to Problem

According to an embodiment of the present invention, there is provided an active matrix substrate that has a plurality of pixels arranged in a matrix having a plurality of rows and a plurality of columns. The active matrix substrate includes: a plurality of first TFTs each associated with any one of the plurality of pixels; a plurality of gate bus lines each extending in a first direction; a plurality of source bus lines each extending in a second direction different from the first direction, the plurality of pixels constituting a plurality of color display pixels, each of the plurality of color display pixels including at least three pixels adjacent to one another in the second direction; a substrate; a gate metal layer that is supported by the substrate and includes, out of a first gate electrode, a first source electrode, and a first drain electrode included in the plurality of first TFTs, the first gate electrode, and the plurality of gate bus lines; a gate insulating layer formed on the gate metal layer; a source metal layer that is formed on the gate insulating layer and includes the first source electrode, the first drain electrode, and the plurality of source bus lines; an interlayer insulating layer formed on the source metal layer; a first transparent conductive layer formed on the interlayer insulating layer; an inorganic insulating layer formed on the first transparent conductive layer; and a second transparent conductive layer formed on the inorganic insulating layer. Each of the plurality of pixels has at least one recess including a hole formed in the interlayer insulating layer, a first transparent electrode that is included in the first transparent conductive layer and is formed on the interlayer insulating layer and in the at least one recess, and a second transparent electrode that is included in the second transparent conductive layer and is electrically connected to the first drain electrode. The second transparent electrode is formed along a side surface and a bottom surface of the at least one recess to be opposite the first transparent electrode with the inorganic insulating layer interposed between the second transparent electrode and the first transparent electrode.

In a certain embodiment, each of the plurality of pixels further has a contact hole that is formed in the interlayer insulating layer and the inorganic insulating layer and reaches a drain extension section extending from the first drain electrode.

In a certain embodiment, an angle of a side surface of the contact hole to a surface parallel to the substrate is smaller than an angle of the side surface of the at least one recess to the surface parallel to the substrate.

In a certain embodiment, the active matrix substrate further includes an upper metal layer that is in direct contact with the first transparent conductive layer or the second transparent conductive layer and that contains metal. The upper metal layer includes a first portion covering the at least one recess when viewed in a normal direction of the substrate.

In a certain embodiment, the upper metal layer further includes a second portion covering a channel region of a semiconductor layer of the first TFT when viewed in a normal direction of the substrate.

In a certain embodiment, the upper metal layer is in direct contact with the first transparent conductive layer and does not overlap the contact hole when viewed in a normal direction of the substrate.

In a certain embodiment, the active matrix substrate further includes a lower metal layer formed below the gate metal layer, and a lower insulating layer formed between the gate metal layer and the lower metal layer. Each of the plurality of pixels further has an auxiliary capacitor electrode that includes the lower metal layer, is electrically connected to the first transparent electrode, and overlaps the drain extension section when viewed in a normal direction of the substrate.

In a certain embodiment, each of the plurality of pixels further has a third portion that is included in the lower metal layer, and is electrically connected to the auxiliary capacitor electrode, and the at least one recess further includes a hole formed in the gate insulating layer and a hole formed in the lower insulating layer, and reaches the third portion.

In a certain embodiment, the plurality of first TFTs have a first semiconductor layer formed on the gate insulating layer, the first semiconductor layer includes an oxide semiconductor, and the second semiconductor layer includes crystalline silicon.

In a certain embodiment, the active matrix substrate further includes a second TFT disposed in a region other than the plurality of pixels. The second TFT has a second semiconductor layer formed on the substrate, the lower insulating layer formed on the second semiconductor layer, a second gate electrode that is included in the gate metal layer and is formed to overlap the second semiconductor layer with the lower insulating layer interposed between the second gate electrode and the second semiconductor layer, the gate insulating layer covering the second gate electrode, and a second source electrode and a second drain electrode that are included in the source metal layer and are connected to the second semiconductor layer.

In a certain embodiment, the lower metal layer further includes a lower light shielding section formed to cover at least a channel region of the second semiconductor layer when viewed in a normal direction of the substrate.

In a certain embodiment, the at least one recess is formed adjacent to the first TFT in each of the plurality of pixels.

In a certain embodiment, the interlayer insulating layer includes an organic insulating layer having a thickness of 1 µm to 4 µm.

In a certain embodiment, the angle of the side surface of the at least one recess to the surface parallel to the substrate is 70° or more.

In a certain embodiment, the at least one recess further includes a hole formed in the gate insulating layer.

In a certain embodiment, two pixels, out of the plurality of pixels, adjacent to each other in the second direction are associated with source bus lines, out of the plurality of source bus lines, different from each other.

According to another embodiment of the present invention, there is provided a liquid crystal display device including the active matrix substrate according to any one of the embodiments described above; a counter substrate disposed to be opposite the active matrix substrate, and a liquid crystal layer provided between the active matrix substrate and the counter substrate.

In a certain embodiment, the second transparent electrode functions as a pixel electrode, and the counter substrate has a counter electrode opposite the second transparent electrode.

In a certain embodiment, the second transparent electrode has at least one slit, the second transparent electrode functions as a pixel electrode, and the first transparent electrode functions as a common electrode.

Advantageous Effects of Invention

According to the embodiments of the present invention, there is provided an active matrix substrate capable of improving a display quality while suppressing a decrease in aperture ratio of a liquid crystal display device having a plurality of pixels in which color display pixels are arranged in a column direction.

BRIEF DESCRIPTION OF DRAWINGS

FIG. 4(a) is a view in which a source metal layer 18 is hatched, FIG. 4(b) is a view in which a gate metal layer 14 is hatched, FIG. 4(c) is a view in which a second transparent conductive layer 22 is hatched, and FIG. 4(d) is a view in which a first transparent conductive layer 20 is hatched.

FIGS. 6(a) and 6(b) are views schematically showing a liquid crystal display device 1000A including the active matrix substrate 100A.

FIGS. 10(a) and 10(b) are views for describing a shadowing in a normally black mode.

DESCRIPTION OF EMBODIMENTS

Figure 1:
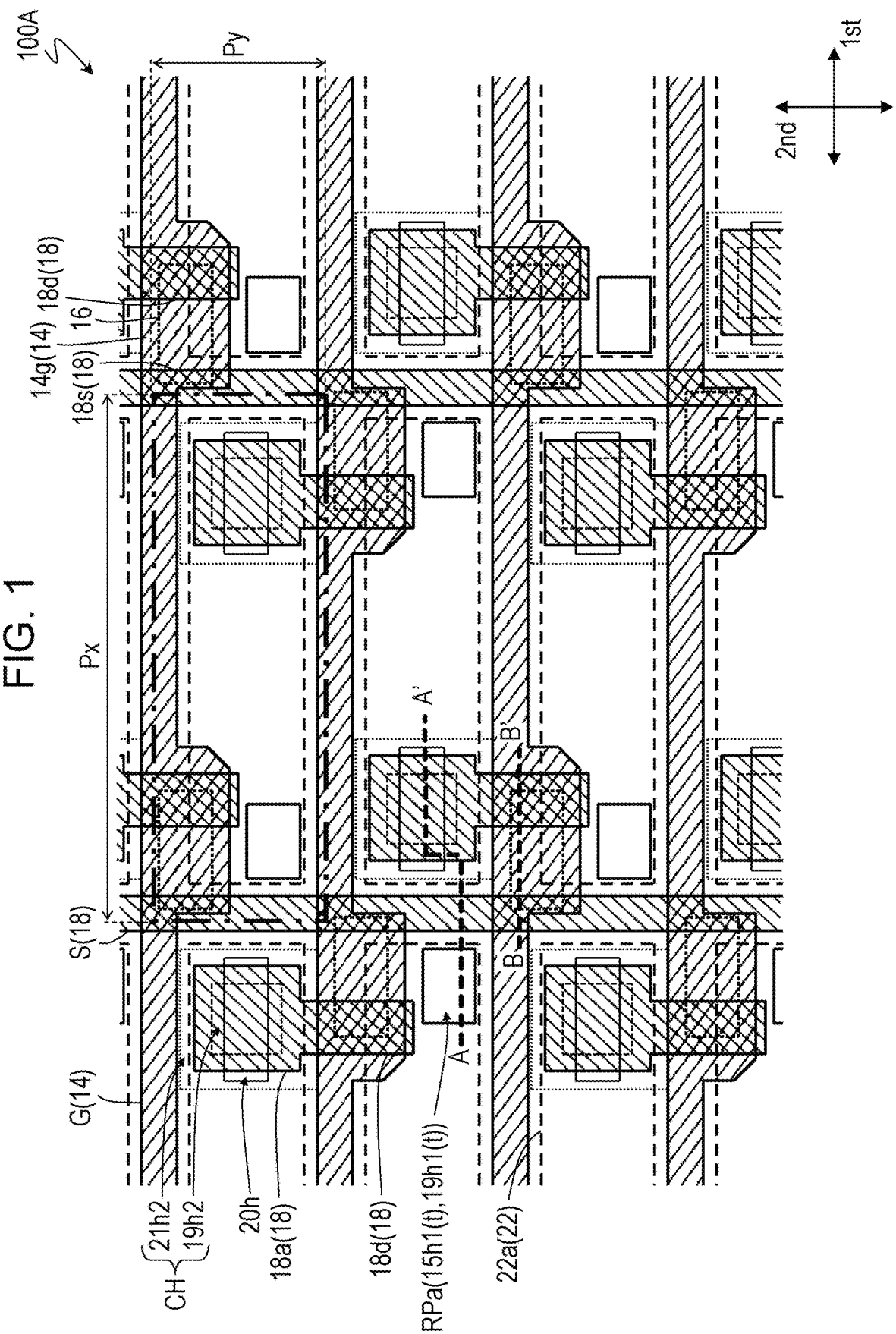
FIG. 1 is a plan view schematically showing an active matrix substrate 100A according to Embodiment 1 of the present invention.

Hereinafter, embodiments of the present invention will be described with reference to the drawings. The present invention is not limited to the embodiments exemplified below. Hereinafter, as an active matrix substrate according to an embodiment of the present invention, an active matrix substrate used for a liquid crystal display device will be exemplified. In the following drawings, components having substantially the same functions are denoted by the same reference numerals and the description thereof may be omitted.

Embodiment 1

Figure 2:
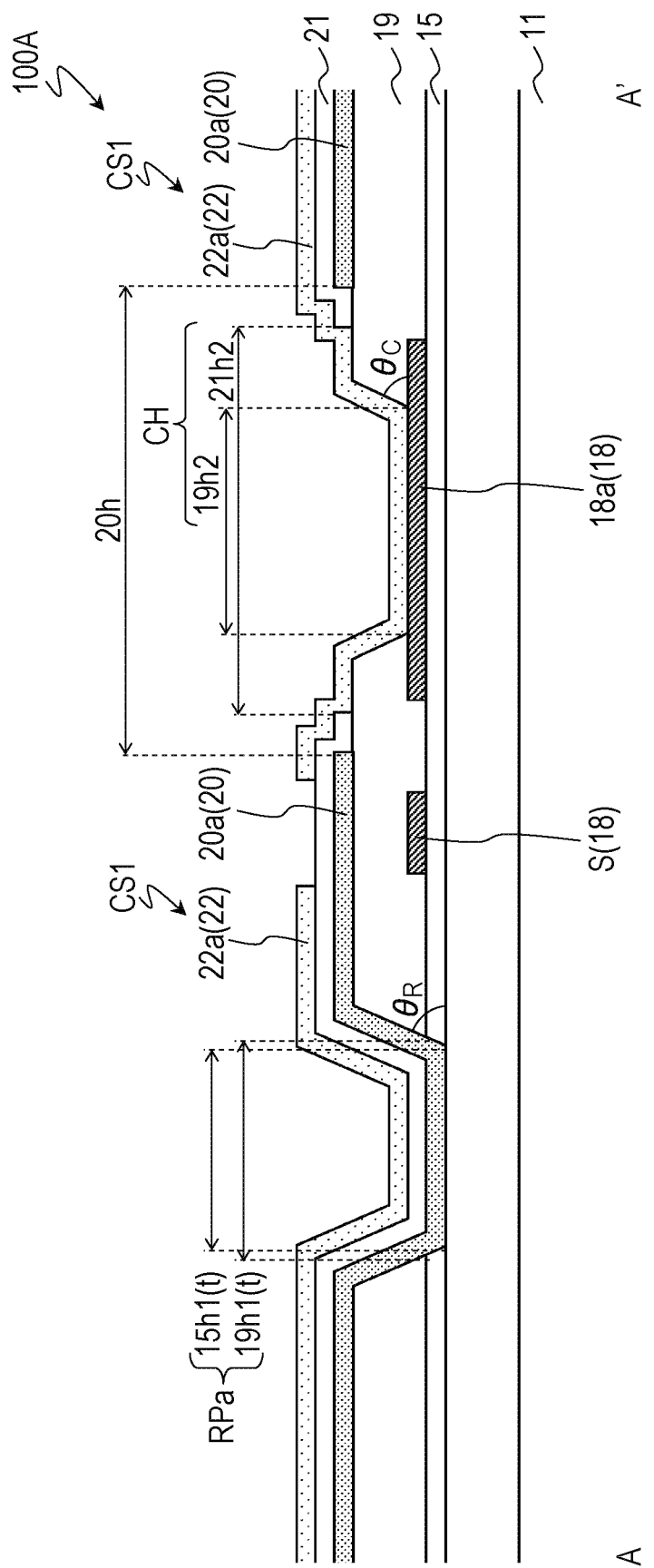
FIG. 2 is a sectional view schematically showing an active matrix substrate 100A, and shows a sectional structure taken along the line A-A' in FIG. 1.
Figure 3:
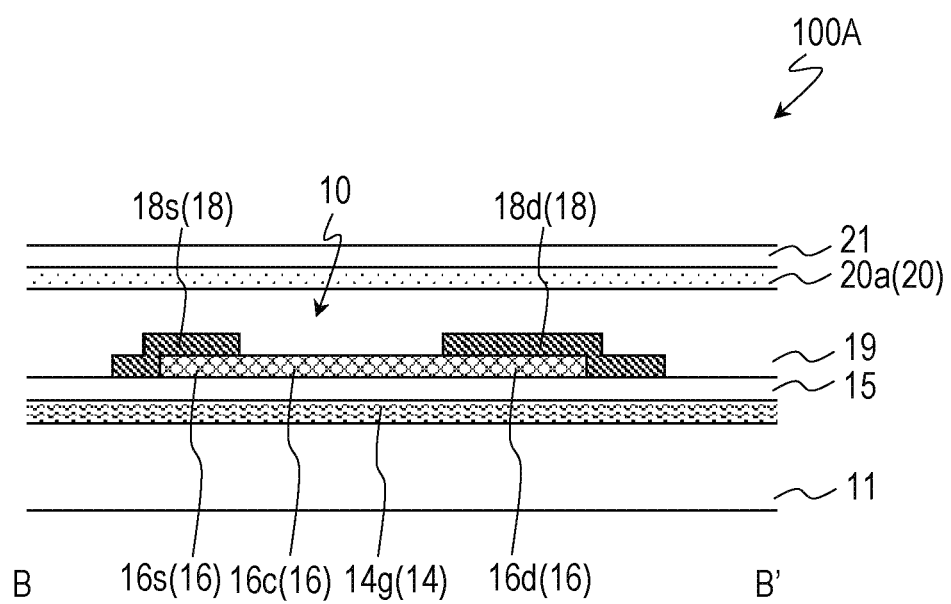
FIG. 3 is a sectional view schematically showing the active matrix substrate 100A, and shows a sectional structure taken along the line B-B' in FIG. 1.
Figure 4:
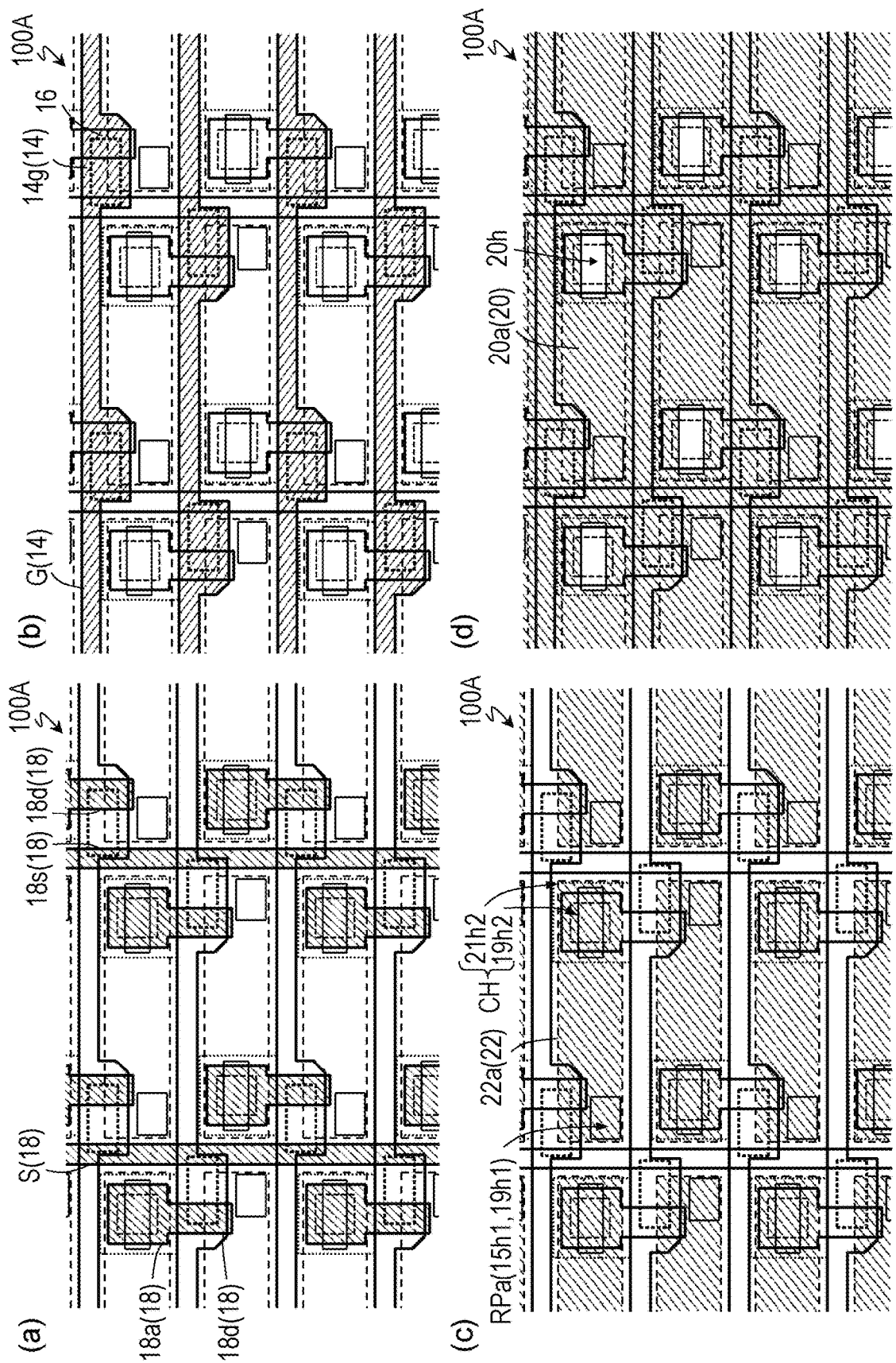
FIGS. 4(a) to 4(d) are plan views schematically showing the active matrix substrate 100A.
Figure 5A:
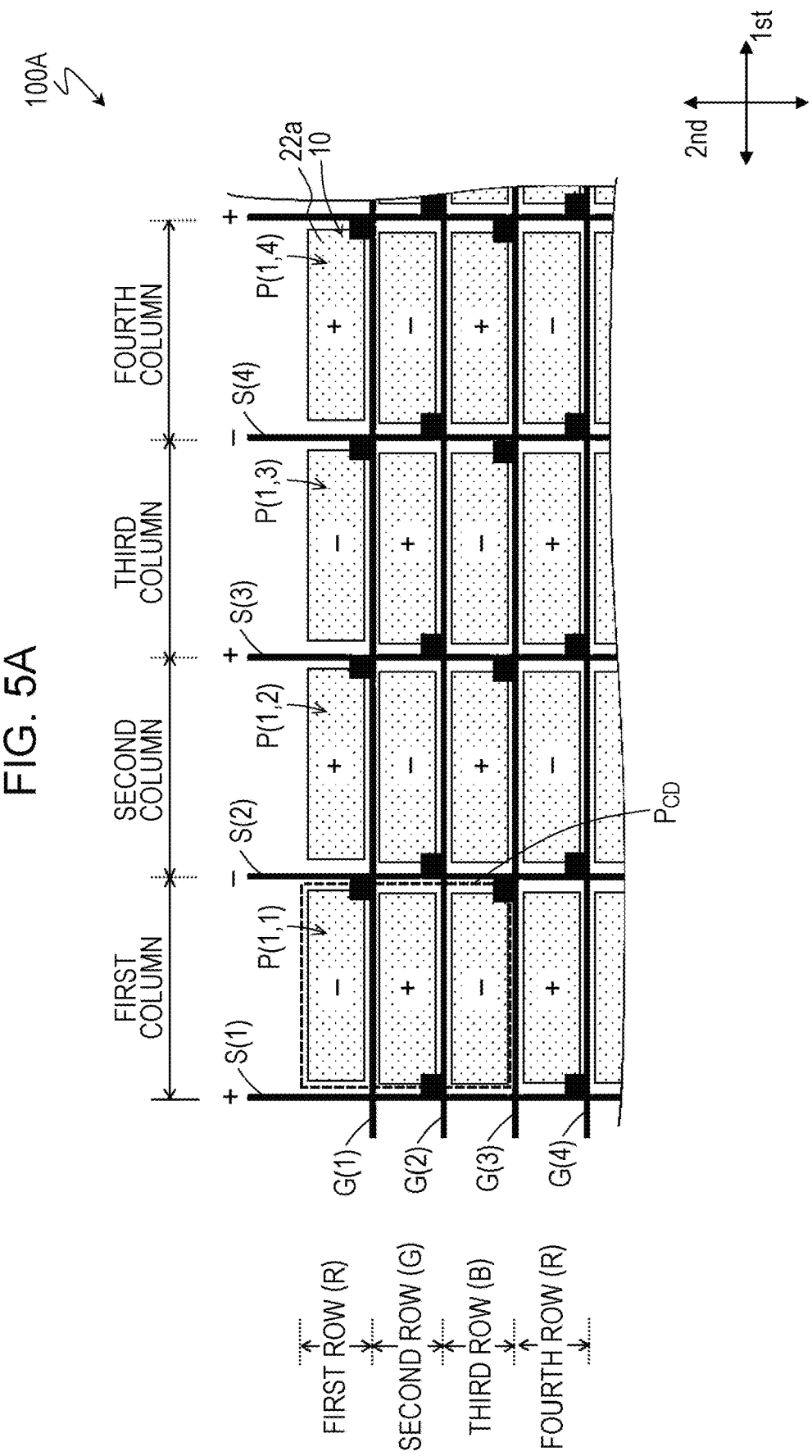
FIG. 5A is a view describing an electric connection relationship between a TFT 10, a gate bus line G, and a source bus line S in each pixel P of the active matrix substrate 100A.

FIGS. 1, 2, 3, 4, and 5A show an active matrix substrate 100A of the present embodiment. FIG. 1 is a plan view schematically showing the active matrix substrate 100A. FIGS. 2 and 3 are sectional views schematically showing the active matrix substrate 100A. FIG. 2 shows a sectional structure taken along the line A-A' in FIG. 1, and FIG. 3 shows a sectional structure taken along the line B-B' in FIG. 1. FIGS. 4(a) to 4(d) are plan views schematically showing the active matrix substrate 100A, FIG. 4(a) is a view in which a source metal layer 18 is hatched, FIG. 4(b) is a view in which a gate metal layer 14 is hatched, FIG. 4(c) is a view in which a second transparent conductive layer 22 is hatched, and FIG. 4(d) is a view in which a first transparent conductive layer 20 is hatched. FIG. 5A is a view for describing an electric connection relationship between the TFT 10, the gate bus line G, and the source bus line S in each pixel P of the active matrix substrate 100A. FIG. 5A also shows the polarity of a display signal voltage applied to each pixel in a certain vertical scanning period.

The active matrix substrate 100A is suitably used, for example, for a liquid crystal display device in a twisted nematic (TN) mode or a vertical alignment (VA) mode. For example, as described below with reference to FIG. 6(a), the liquid crystal display device of the present embodiment has the active matrix substrate 100A, a counter substrate, and a liquid crystal layer provided between the active matrix substrate 100A and the counter substrate, and the counter substrate has a counter electrode opposite a pixel electrode 22a.

As shown in FIG. 1, the active matrix substrate 100A includes a plurality of regions P arranged in a matrix having a plurality of rows and a plurality of columns, a plurality of TFTs 10 (also referred to as a "pixel TFT 10"), the pixel electrode 22a provided in each region P, a plurality of gate bus lines G each extending in a first direction, and a plurality of source bus lines S each extending in a second direction different from the first direction. Each of the plurality of regions P corresponds to each pixel of the liquid crystal display device including the active matrix substrate 100A. In the specification of the present application, a region P of the active matrix substrate 100A corresponding to each pixel of the liquid crystal display device is also referred to as the "pixel".

In the illustrated active matrix substrate, the first direction is a horizontal direction and the second direction is a vertical direction. Accordingly, a plurality of pixels arranged along the first direction may be referred to as a pixel row and a plurality of pixels arranged along the second direction may be referred to as a pixel column. The first direction may be referred to as a row direction, and the second direction may be referred to as a column direction. The first direction and the second direction are not limited to this example.

Each of the plurality of TFTs 10 is associated with any one of a plurality of pixels P. That is, the TFT 10 is provided corresponding to each pixel P. The TFT 10 has a gate electrode 14g, a source electrode 18s, and a drain electrode 18d. The gate electrode 14g of each TFT 10 is electrically connected to any one of the plurality of gate bus lines G, and the source electrode 18s of each TFT 10 is electrically connected to any one of the plurality of source bus lines S. Each gate bus line G is supplied with a scan signal voltage from a gate driver (not shown), and each source bus line S is supplied with a display signal voltage from a source driver (not shown). The drain electrode 18d of each TFT 10 is electrically connected to the pixel electrode 22a provided in each pixel P.

The pixel P includes a pixel opening that actually contributes to a display, and has a size (Px×Py) determined by an arrangement pitch of the pixel P (a pitch in the row direction is Px and a pitch in the column direction is Py). The pixel P can be considered as, for example, a region surrounded by a dash-dotted line in FIG. 1. Although the TFT 10, the gate bus line G, and the source bus line S for driving the pixel P are not components of the pixel P, the TFT 10, the gate bus line G, and the source bus line S for driving the pixel P, are expressed to be "associated with the pixel P" to express a relationship with the pixel P. For example, an expression that "a certain TFT 10 is associated with a certain pixel P" means that "a drain electrode 18d of the certain TFT 10 is electrically connected to a pixel electrode 22a included in the certain pixel P". An expression that "a certain gate bus line G is associated with a certain pixel P" means that the certain gate bus line G is connected to a gate electrode 16g of the TFT 10 associated with the certain pixel P. An expression that "a certain source bus line S is associated with a certain pixel P" means that the certain source bus line S is connected to a source electrode 18s of the TFT 10 associated with the certain pixel P.

The gate bus line G and the source bus line S may be expressed in a relationship with the pixel row and the pixel column, respectively. An expression that "a certain gate bus line G is associated with a certain pixel row" means that the certain gate bus line G is connected to a gate electrode 16g of the TFT 10 associated with at least one of the pixels P that are included in the certain pixel row. An expression that "a certain source bus line S is associated with a certain pixel column" means that the certain source bus line S is connected to a source electrode 18s of the TFT 10 associated with at least one of the pixels P that are included in the certain pixel column.

As shown in FIG. 5A, the plurality of pixels P of the active matrix substrate 100A constitute a plurality of color display pixels $P_{CD}$, and each of the plurality of color display pixels $P_{CD}$ includes at least three pixels adjacent to one another in the second direction. In the illustrated example, each of the plurality of color display pixels $P_{CD}$ includes three pixels adjacent to one another in the second direction. That is, the illustrated active matrix substrate has a triple gate structure. For example, a red (R) pixel, a green (G) pixel, and a blue (B) pixel arranged in the column direction constitute one color display pixel $P_{CD}$, and an R pixel row, a G pixel row, and a B pixel row are arranged in a stripe shape (that is, different colors are displayed for each pixel row). In the active matrix substrate 100A having a triple gate structure, typically, a pixel pitch Px in the row direction is larger than a pixel pitch Py in the column direction. For example, the pixel pitch Px in the row direction is about three times the pixel pitch Py in the column direction.

The present embodiment is not limited to this example, and one color display pixel may be constituted by four or more pixels arranged in the column direction. In addition to the red (R) pixel, the green (G) pixel, and the blue (B) pixel, the color display pixel may be constituted by at least one other color pixel (a yellow (Y) pixel, a cyan (C) pixel, a magenta (M) pixel, or a white (W) pixel).

The plurality of pixels P are arranged in a matrix (rp×cq) having rp rows and cq columns. A pixel in a p-th row and a q-th column (where $1 \leq p \leq rp$, $1 \leq q \leq cq$) may be denoted as a pixel P(p, q).

Each of the plurality of gate bus lines G is associated with any one of a plurality of pixel rows. The gate bus line G associated with the p-th pixel row may be denoted as a gate bus line G(p).

The plurality of source bus lines S are provided for each pixel column. In the drawing, the source bus line provided on the left side of the q-th pixel column is denoted as a source bus line S(q). In the illustrated example, two pixels adjacent to each other in the second direction are associated with the source bus lines S different from each other. In addition, the polarities of the display signal voltages supplied from the source bus lines S adjacent to each other are opposite to each other in respective vertical scanning periods. By having such a configuration, the polarities of display signal voltages supplied to the pixels adjacent to each other can be opposite to each other in respective vertical scanning periods without inverting the polarity of the display signal voltage supplied to each source bus line S in each vertical scanning period. In other words, the source line inversion drive can virtually realize the arrangement of pixels in the dot inversion drive. In addition, particularly in a small-sized, high resolution liquid crystal display device, a region other than the pixel opening can be made effective by adopting a configuration in which two pixels adjacent to each other in the second direction are associated with the source bus lines S different from each other. Further, the present embodiment is not limited to the illustrated example, and the electric connection relationship between the TFT 10, the gate bus line G, and the source bus line S may be appropriately modified. For example, each of the plurality of source bus lines S is associated with any one of the plurality of pixel columns.

The structure of the active matrix substrate 100A will be described more specifically.

As shown in FIGS. 2 and 3, the active matrix substrate 100A has the gate metal layer 14, a gate insulating layer 15, a semiconductor layer 16, the source metal layer 18, an interlayer insulating layer 19, the first transparent conductive layer 20, an inorganic insulating layer 21, and the second transparent conductive layer 22.

The gate metal layer 14 is formed on a substrate 11. The gate metal layer 14 includes the gate electrodes 14g and the plurality of gate bus lines G of the plurality of TFTs 10. The gate metal layer 14 may have a single-layer structure or a stacked structure in which a plurality of layers are stacked. The gate metal layer 14 includes at least a layer formed of the metal material. In a case where the gate metal layer 14 has the stacked structure, some layers may be formed of a metal nitride or a metal oxide. The gate metal layer 14 is made of, for example, any of the metal such as aluminum (Al), tungsten (W), molybdenum (Mo), tantalum (Ta), chromium (Cr), titanium (Ti), and copper (Cu), an alloy containing the above-described metal, and the nitride thereof.

The gate insulating layer 15 is formed on the gate metal layer 14. That is, the gate insulating layer 15 is formed to cover the gate electrode 14g and the gate bus line G. The gate insulating layer 15 is formed of an inorganic insulation material. The gate insulating layer 15 is, for example, a silicon oxide (SiOx) film, a silicon nitride (SixNy) film, a silicon oxynitride (SiOxNy; x>y) film, a silicon nitride oxide (SiNxOy; x>y) film, or the stacked film thereof.

The semiconductor layer 16 is formed on the gate insulating layer 15 and includes an active layer of the TFT 10.

The semiconductor layer 16 may be, for example, an amorphous silicon layer, a crystalline silicon layer, or an oxide semiconductor layer. A crystalline silicon layer may be, for example, a polysilicon layer.

The semiconductor layer 16 includes a channel region (also referred to as an "active region") 16c, a source region (also referred to as a "source contact region") 16s, and a drain region (also referred to as a "drain contact region") 16d. The source region 16s is a portion in contact with the source electrode 18s in the semiconductor layer 16, and the drain region 16d is a portion in contact with the drain electrode 18d in the semiconductor layer 16. The channel region 16c is a region positioned between the source region 16s and the drain region 16d. The channel region 16c is, for example, a portion overlapping the gate electrode 14g with the gate insulating layer 15 interposed therebetween in the semiconductor layer 16.

The source metal layer 18 is formed on the gate insulating layer 15. The source metal layer 18 includes the source electrode 18s and the drain electrode 18d of the TFT 10, and the plurality of source bus lines S. The source metal layer 18 further includes a drain extension section 18a extending from the drain electrode 18d. Each pixel P has the TFT 10 and the drain extension section 18a (that is, the TFT 10 and the drain extension section 18a are provided in each pixel P). The source metal layer 18 may have a single layer structure or a stacked structure in which a plurality of layers are stacked. The source metal layer 18 includes at least the layer formed of the metal material. In a case where the source metal layer 18 has the stacked structure, some layers may be formed of the metal nitride or the metal oxide. The source metal layer 18 is made of, for example, any of the metal such as aluminum (Al), tungsten (W), molybdenum (Mo), tantalum (Ta), chromium (Cr), titanium (Ti), and copper (Cu), the alloy containing the above-described metal, and the nitride thereof.

The interlayer insulating layer 19 is formed on the source metal layer 18. The interlayer insulating layer 19 is formed to cover the TFT 10. The interlayer insulating layer 19 has an opening 19h2 reaching the drain extension section 18a in each pixel P. For example, the interlayer insulating layer 19 includes an inorganic insulating layer which is formed of the inorganic insulation material, and which is formed to cover the TFT 10, and an organic insulating layer (a planarization layer) which is formed on the inorganic insulating layer, and which is formed of an organic insulation material. In addition, although the interlayer insulating layer 19 is not limited to the configuration, it is preferable that an organic insulating layer is included. The organic insulating layer preferably has a thickness of 1 μm to 4 μm, for example.

The first transparent conductive layer 20 is formed on the interlayer insulating layer 19. The first transparent conductive layer 20 is formed of a transparent conductive material. The first transparent conductive layer 20 includes a first transparent electrode 20a. The first transparent electrode 20a is formed not to overlap the entire opening 19h2 of the interlayer insulating layer 19 when viewed in a normal direction of the substrate 11. In FIG. 1, the illustration of the first transparent electrode 20a is omitted. As shown in FIG. 4(d), the first transparent conductive layer 20 is formed on an entire surface of the substrate 11, and in each pixel P, the first transparent conductive layer 20 has an opening 20h overlapping the opening 19h2 of the interlayer insulating layer 19 when viewed in a normal direction of the substrate 11. That is, the first transparent electrode 20a is formed in a region other than the opening 20h.

The inorganic insulating layer 21 is formed on the first transparent conductive layer 20. The inorganic insulating layer 21 is formed of the inorganic insulation material. The inorganic insulating layer 21 has an opening 21h2 overlapping the opening 19h2 formed in the interlayer insulating layer 19 when viewed in a normal direction of the substrate 11. The opening 19h2 formed in the interlayer insulating layer 19 and the opening 21h2 formed in the inorganic insulating layer 21 constitute a contact hole CH. In other words, in the interlayer insulating layer 19 and the inorganic insulating layer 21, the contact hole CH reaching the drain extension section 18a is formed.

The second transparent conductive layer 22 is formed on the inorganic insulating layer 21. The second transparent conductive layer 22 is formed of the transparent conductive material. The second transparent conductive layer 22 includes a second transparent electrode 22a. The second transparent electrode 22a is provided for every pixel P (that is, each pixel P includes the second transparent electrode 22a) and is electrically connected to the drain extension section 18a. The second transparent electrode 22a functions as the pixel electrode. In the illustrated example, the pixel electrode 22a is formed on the inorganic insulating layer 21 and in the contact hole CH, and is in contact with the drain extension section 18a in the contact hole CH.

The pixel electrode 22a is opposite the first transparent electrode 20a with the inorganic insulating layer 21 interposed therebetween, and the pixel electrode 22a and the first transparent electrode 20a, and the inorganic insulating layer 21 positioned in between the pixel electrode 22a and the first transparent electrode 20a constitute an auxiliary capacitor CS1. Further, the auxiliary capacitor CS1 may be formed even when the pixel electrode 22a and the first transparent electrode 20a do not overlap when viewed in a normal direction of the substrate 11.

Each of the plurality of pixels P has a recess RPa including a hole 19h1 formed in the interlayer insulating layer 19. In the specification of the present application, the "hole" formed in the insulating layer includes both a through hole formed to penetrate the insulating layer and a hollow (recess) formed on the surface of the insulating layer. When the "hole" is a through hole, (t) may be added to the end of its reference sign, and when the "hole" is a hollow, (h) may be added to the end of its reference sign. In addition, the "hole" which is a through hole may be called an "opening". In the illustrated example, the recess RPa is constituted by a hole 19h1(t) formed in the interlayer insulating layer 19 and a hole 15h1(t) formed in the gate insulating layer 15. The second transparent electrode (pixel electrode) 22a is formed along a side surface and a bottom surface of the recess RPa to be opposite the first transparent electrode 20a with the inorganic insulating layer 21 interposed therebetween. Since the areas of the first transparent electrode 20a and the second transparent electrode (pixel electrode) 22a opposed to each other with the inorganic insulating layer 21 interposed therebetween are increased by having the recess RPa in each pixel P, the capacitance value of the auxiliary capacitor CS1 increases.

In the active matrix substrate 100A, each pixel P has the recess RPa, and each pixel P is provided with the auxiliary capacitor CS1 electrically connected (for example, connected in parallel) to a liquid crystal capacitor. Since the capacitance value of the auxiliary capacitor CS1 can be sufficiently secured, the active matrix substrate 100A can improve the display quality of the liquid crystal display device.

Since the alignment of liquid crystal molecules may be disturbed around the recess RPa, a decrease in the display quality of the liquid crystal display device can be suppressed by covering the periphery of the recess Rpa with a light shielding layer (black matrix). In each of the plurality of pixels P, the recess RPa is formed adjacent to the TFT 10. Since the region around the TFT 10 is often covered with the light shielding layer (black matrix), a decrease in aperture ratio due to the provision of the recess RPa is suppressed. The active matrix substrate 100A can improve the display quality of the liquid crystal display device while suppressing the decrease in the aperture ratio of the liquid crystal display device.

In addition, as described above, since the first transparent electrode 20a and the second transparent electrode 22a constituting the auxiliary capacitor CS1 are each formed of the transparent conductive material, the active matrix substrate 100A can secure an auxiliary capacitance value while suppressing the decrease in the aperture ratio of the liquid crystal display device.

The structure of the active matrix substrate 100A may be referred to as a "two-layer electrode structure". The two-layer electrode structure denotes a structure in which a lower layer transparent electrode, a dielectric layer covering the lower layer transparent electrode, and an upper layer transparent electrode overlapping the lower layer transparent electrode with the dielectric layer interposed therebetween are provided on the interlayer insulating layer covering the TFT. The active matrix substrate 100A has the two-layer electrode structure, thereby having the auxiliary capacitor CS1.

The active matrix substrate 100A has the two-layer electrode structure, thereby having the following advantage. Since the pixel electrode 22a can be electrically shielded from the gate bus line G and the source bus line S by the first transparent electrode 20a, it is possible to suppress a formation of an electrostatic capacitance (the parasitic capacitance) between the pixel electrode 22a and the gate bus line G or the source bus line S. Therefore, a flicker or a shadowing can be suppressed. In particular, in a case where the interlayer insulating layer 19 has a thickness of about 1 μm to 4 μm and includes the organic insulating layer having a low relative dielectric constant (for example, about 2 to 4), it is possible to decrease a load of the gate bus line G or the source bus line S, which enables a reduction of power consumption.

From the viewpoint of increasing the capacitance value of the auxiliary capacitor CS1, it is preferable that an angle $\theta_R$ of the side surface of the recess RPa to the surface parallel to the substrate 11 (sometimes referred to as a "substrate surface") is large. When a recess is formed in a region of a certain area of an insulating layer having a certain thickness, the sum of areas of a side surface and a bottom surface of the recess is the largest when the angle of the side surface of the recess to the substrate surface is 90°. The angle $\theta_R$ of the side surface of the recess RPa to the substrate surface is preferably about 70° or more.

Here, the angle of the side surface of the recess to the substrate surface is 90° or less. If the angle of the side surface of the recess to the substrate surface is more than 90°, the sum of the areas of the side surface and the bottom surface of the recess may be further increased in some cases. However, as described below, there is a concern that, when the first transparent conductive layer 20, the inorganic insulating layer 21, and the second transparent conductive layer 22 are formed in the recess, discontinuous portions are likely to occur, which is not preferable.

Figure 5B:
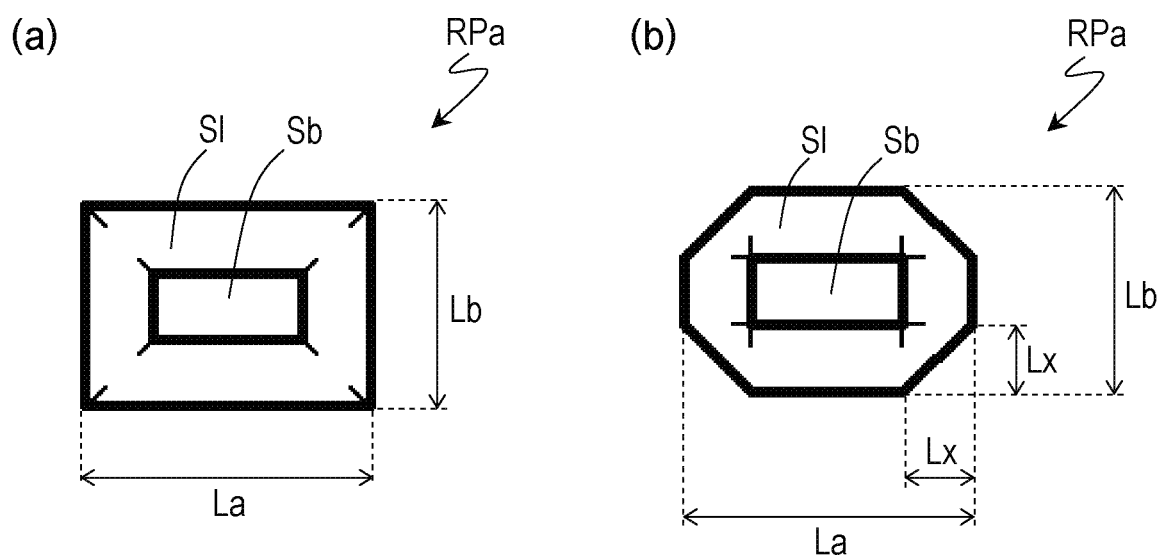
FIGS. 5B(a) and 5B(b) are schematic plan views when a recess RPa is viewed in a normal direction of a substrate 11.

FIGS. 5B(a) and 5B(b) are schematic plan views when the recess RPa is viewed in a normal direction of the substrate 11. FIG. 5B(a) shows the recess Rpa formed in a rectangular region of 4.25 μm×3.0 μm (La=4.25 μm and Lb=3.0 μm in the drawing). FIG. 5B(b) shows the recess RPa formed in a region obtained by cutting out four corner portions from the region shown in FIG. 5B(a) (Lx=1.0 μm in the drawing). The recess RPa shown in FIG. 5B(b) takes into consideration the rounding of the corner portion in the step of manufacturing the recess RPa shown in FIG. 5B(a). The degree of rounding of the corner portion depends on the method of manufacturing the recess (for example, the manufacturing step or manufacturing machine). A photomask may be corrected in advance in consideration of the rounding of the corner portion.

The present inventor has made a trial calculation under the following conditions. The recess RPa is formed in the region shown in FIG. 5B(b), and the interlayer insulating layer 19 is composed of an inorganic insulating layer (silicon nitride) having a thickness of 330 nm and an organic insulating layer (photosensitive acrylic resin) having a thickness of 3 μm. When the angle $\theta_R$ is 67°, the sum of areas of a side surface Sl and a bottom surface Sb of the recess Rpa is about twice the area of the region in a case where the recess Rpa is not formed, and the capacitance value of the auxiliary capacitor CS1 is increased by about 11 points as compared with the case where the recess Rpa is not formed.

Meanwhile, there is a concern that, if the angle of the side surface of the recess to the substrate surface increases, when the first transparent conductive layer 20, the inorganic insulating layer 21, and the second transparent conductive layer 22 are formed in the recess, discontinuous portions are likely to occur. Therefore, the angle $\theta_R$ of the side surface of the recess RPa to the substrate surface is preferably less than about 85°. An angle $\theta_C$ of the side surface of the contact hole CH to the substrate surface is preferably smaller than the angle $\theta_R$ of the side surface of the recess RPa to the substrate surface. Since there is a portion where the first transparent conductive layer 20 is not formed in the contact hole CH, it does not contribute much to the capacitance value of the auxiliary capacitor CS1 even if the sum of the areas of the side surface and the bottom surface of the contact hole CH is increased. By reducing the angle $\theta_C$ of the side surface of the contact hole CH to the substrate surface, it is possible to prevent the second transparent conductive layer 22 from being disconnected in the contact hole CH.

The angle of the side surface of the recess RPa to the substrate surface is, for example, an angle of a side surface of the hole 19h1 formed in the interlayer insulating layer 19 to the substrate surface. The side surface of interlayer insulating layer 19 and the side surface of gate insulating layer 15 may be aligned on the side surface of recess RPa. In this case, the angle of the side surface of the hole 19h1 formed in the interlayer insulating layer 19 to the substrate surface and the angle of the side surface of a hole 15h1 formed in the gate insulating layer 15 are equal to each other. In the present specification, the expression "the side surface alignment" of two or more different layers on the side surface of the recess (or contact hole) means that the side surfaces exposed in the recesses (or contact holes) of these layers are flush and the side surfaces of the recesses (or contact holes) are continuously formed. The side surface of the recess (or contact hole) may be an inclined surface such as a tapered shape, or may be a surface perpendicular to the substrate surface. Such a configuration can be obtained, for example, by etching these layers using the same mask, or by etching the other layer using one layer as a mask.

When the interlayer insulating layer 19 has an inorganic insulating layer and an organic insulating layer formed on the inorganic insulating layer, the recess RPa may be formed by collectively etching a gate insulation film for forming the gate insulating layer 15 and an inorganic insulation film for forming the interlayer insulating layer 19. In this case, in the contact hole CH formation region, the gate insulation film is not etched because the drain extension section 18a functions as an etch stop.

When the angle $\theta_R$ of the side surface of the recess RPa to the substrate surface and the angle $\theta_C$ of the side surface of the contact hole CH to the substrate surface are different from each other, by performing an exposure step using a multi-tone mask, the hole 19h1 and the opening 19h2 having side surfaces having different angles with respect to the substrate surface can be formed in a common dielectric film without increasing the number of manufacturing steps and the number of photomasks. A gray tone mask or a halftone mask can be used as the multi-tone mask. In the gray tone mask, a slit having a resolution equal to or less than the resolution of an exposure machine is formed, and an intermediate exposure is realized by blocking part of the light using the slit. Meanwhile, in the halftone mask, an intermediate exposure is realized by using a semi-transmissive film.

When the recess is formed in a region of a certain area, if the angle of the side surface of the recess to the substrate surface is fixed, and the sum of the areas of the side surface and the bottom surface of the recess becomes larger when the thickness of the insulating layer forming the recess is large. Therefore, from the viewpoint of increasing the capacitance value of the auxiliary capacitor CS1, it is preferable that the thickness of the insulating layer forming the recess is larger. For example, as illustrated, it is preferable that the recess RPa is constituted by the hole (through hole) 19h1(t) formed in the interlayer insulating layer 19 and the hole (through hole) 15h1(t) formed in the gate insulating layer 15.

Figure 7:
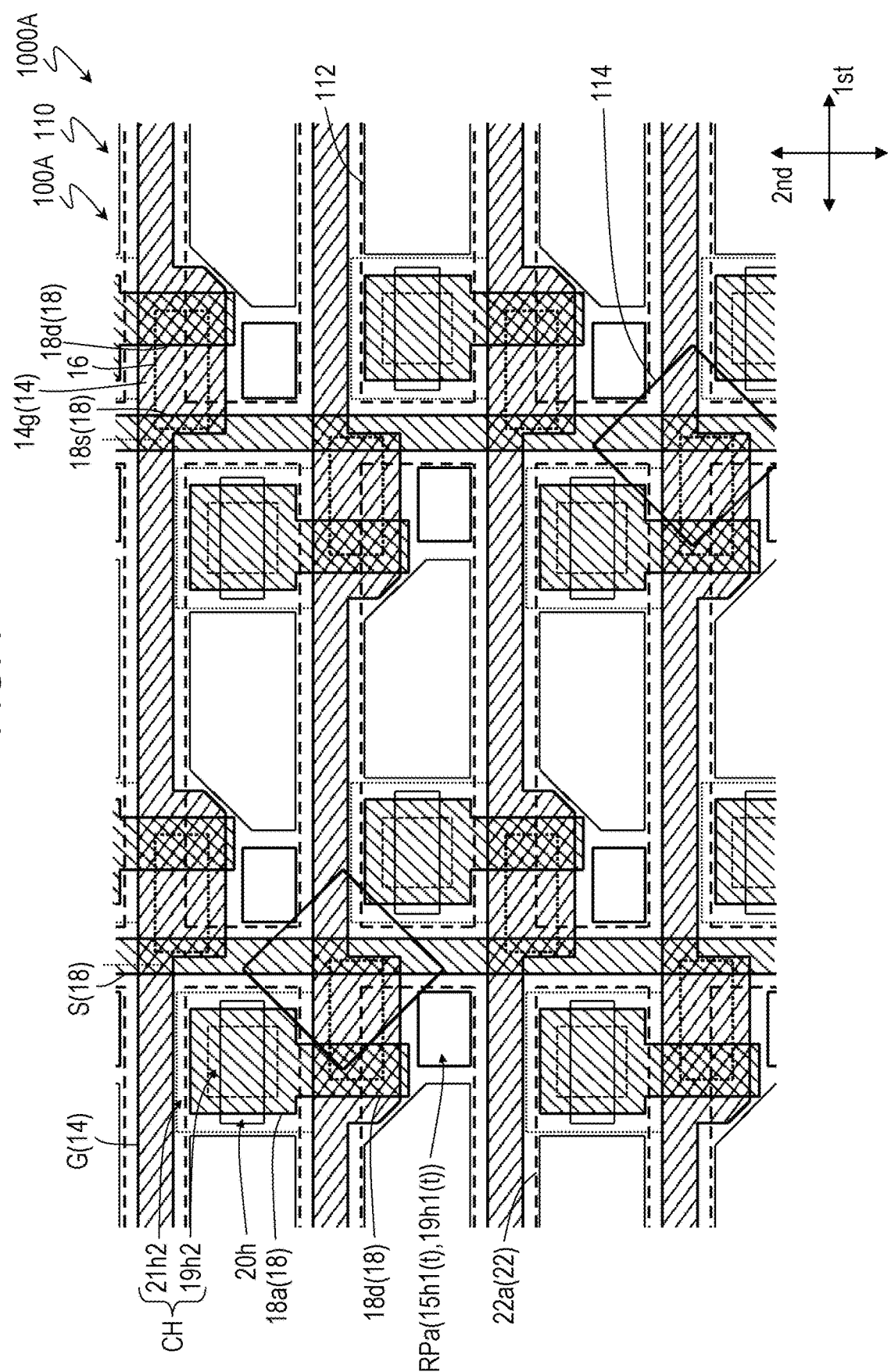
FIG. 7 is a plan view schematically showing the liquid crystal display device 1000A.
Figure 8:
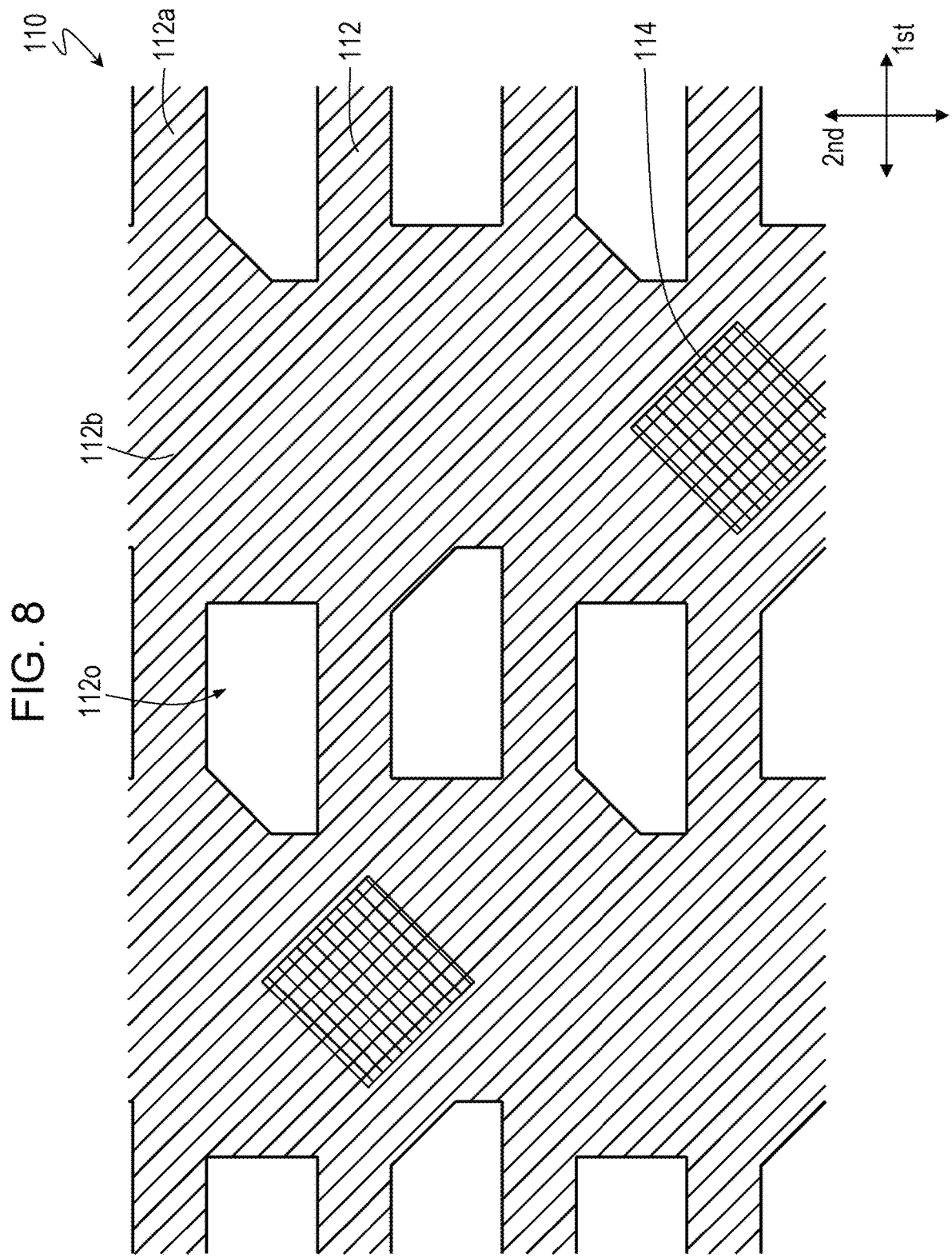
FIG. 8 is a plan view schematically showing a counter substrate 110 included in the liquid crystal display device 1000A.

The liquid crystal display device including the active matrix substrate 100A will be described with reference to FIGS. 6, 7, and 8. A liquid crystal display device 1000A of the present embodiment is, for example, a liquid crystal display device in a TN mode or a VA mode. FIGS. 6(a) and 6(b) are views schematically showing the liquid crystal display device 1000A, FIG. 7 is a plan view schematically showing the liquid crystal display device 1000A, and FIG. 8 is a plan view schematically showing a counter substrate 110 included in the liquid crystal display device 1000A.

As shown in FIG. 6(a), the liquid crystal display device 1000A includes the active matrix substrate 100A, the counter substrate 110 disposed to be opposite the active matrix substrate 100A, and a liquid crystal layer 120 provided between the active matrix substrate 100A and the counter substrate 110.

In a display mode (TN mode or VA mode) in which a longitudinal electric field is applied to the liquid crystal layer 120, the counter electrode (not shown) facing the pixel electrode 22a is provided on the counter substrate 110. The liquid crystal capacitor of each pixel P of the liquid crystal display device 1000A is constituted by the pixel electrode 22a, the counter electrode formed on the counter substrate 110, and the liquid crystal layer 120. The counter electrode is formed of the transparent conductive material (for example, ITO).

The counter substrate 110 typically has a color filter (not shown) and a black matrix (a light shielding layer) 112. The black matrix 112 includes a plurality of first light shielding sections 112a each extending in the first direction, a plurality of second light shielding sections 112b each extending in the second direction, and a plurality of openings 112o. In addition, the counter substrate 110 has a plurality of columnar spacers 114 for holding a gap between the active matrix substrate 100A and the counter substrate 110. The plurality of columnar spacers 114 may include, for example, a first spacer (also referred to as a "main spacer") regulating a distance between the active matrix substrate 100A and the counter substrate 110, and a second spacer lower than the first spacer (also referred to as a "sub-spacer"). The second spacer is, for example, approximately 0.3 μm lower than the first spacer. Further, the plurality of columnar spacers 114 may be provided on the active matrix substrate 100A.

The active matrix substrate according to the embodiment of the present invention is not limited to the liquid crystal display device in the TN mode or the VA mode, and is also suitably used, for example, for a liquid crystal display device in a fringe field switching (FFS) mode. In a display mode (for example, the FFS mode) in which a lateral electric field is applied to the liquid crystal layer 120, the first transparent electrode 20a functions as the common electrode (also referred to as the "counter electrode"), and the pixel electrode 22a and the common electrode 20a constitute an electrode pair that generates the lateral electric field in the liquid crystal layer. The liquid crystal capacitor is constituted by the pixel electrode 22a, the common electrode 20a, and the liquid crystal layer 120. The pixel electrode 22a has at least one slit (one slit or a plurality of slits extending in parallel to one another). In general, in the liquid crystal display device in the lateral electric field mode, no counter electrode is provided on the counter substrate. However, an electrode facing the pixel electrode may be provided on the counter substrate so as to be caused to function as a shield electrode for preventing the occurrence of an alignment disorder of the liquid crystal due to an electric field from outside the counter substrate side.

In the liquid crystal display device in the lateral electric field mode, an electric field is generated, the electric field being represented by the electric lines of force emanating from the pixel electrode, passing through the liquid crystal layer, further passing through the slit of the pixel electrode, and entering the common electrode. This electric field has a component in a lateral direction with respect to the liquid crystal layer. As a result, the electric field in the lateral direction can be applied to the liquid crystal layer. In the lateral electric field type, the amount of the component of liquid crystal molecules rising from the substrate is small, which is the advantage of being able to realize a wide viewing angle as compared with a longitudinal electric field type.

The liquid crystal layer 120 is provided between the active matrix substrate 100A and the counter substrate 110. As the liquid crystal layer 120, typically, a liquid crystal with positive dielectric anisotropy is used in the TN mode, and a liquid crystal with negative dielectric anisotropy is used in the VA mode. In the FFS mode, the liquid crystal with the positive dielectric anisotropy may be used, or the liquid crystal with the negative dielectric anisotropy may be used.

Alignment films 130a and 130b are provided on a surface of the liquid crystal layer 120 side of each of the active matrix substrate 100A and the counter substrate 110. For example, in the active matrix substrate 100A, the alignment film 130a is provided on the second transparent conductive layer 22. As the alignment films 130a and 130b, typically, a horizontal alignment film is used in the TN mode or the FFS mode, and a vertical alignment film is used in the VA mode. As the alignment film, an organic alignment film or an inorganic alignment film can be used, for example. The organic alignment film is formed of an organic material such as polyimide, and controls an alignment direction of liquid crystal molecules by a rubbing treatment or the like. The inorganic alignment film controls the alignment direction of liquid crystal molecules by forming a large number of the columnar structures of silicon oxide at a predetermined density.

Typically, a pair of polarizers opposite to each other with the liquid crystal layer 120 interposed therebetween is provided. Furthermore, a retarder is provided on a back surface side of the liquid crystal layer 120 and/or on a viewer side as necessary.

As shown in FIG. 6(b), the liquid crystal display device 1000A including the active matrix substrate 100A has a display region defined by the plurality of pixels and a non-display region (also referred to as a "picture-frame region") around the display region. A region R1 of the active matrix substrate 100A corresponding to the display region of the liquid crystal display device 1000A is also referred to as a "display region", and a region R2 of the active matrix substrate 100A other than the display region R1 is referred to as a "non-display region".

The active matrix substrate 100A has a gate driver circuit (also referred to as a "gate driver") 140 and a source driver circuit (also referred to as a "source driver") 150 in the non-display region R2. For example, as shown in FIG. 6(b), the gate driver circuit 140 is formed on the substrate 11, and the source driver circuit 150 is mounted on the active matrix substrate 100A using, for example, a chip on glass (COG). Each of the plurality of gate bus lines G is connected to each terminal of the gate driver circuit 140. Each of the plurality of source bus lines S is connected to each terminal of the source driver circuit 150. Without being limited to the above description, the gate driver circuit 140 may be mounted on the active matrix substrate 100A using the chip on glass (COG). The gate driver 140 circuit and/or the source driver circuit 150 may be mounted on the active matrix substrate 100A using a chip on film (COF).

As shown in FIG. 6(b), assuming that the row direction is a right and left direction, the gate driver circuit 140 may include a first gate driver 140A disposed on the left side of the display region R1 and a second gate driver 140B disposed on the right side of the display region R1. Each gate bus line G may be supplied with a scan signal voltage from either the first gate driver 140A or the second gate driver 140B. Note that, the disposition of the gate driver circuit 140 and the source driver circuit 150 is not limited to the illustrated example.

Here, the mechanism of causing the shadowing or shadowing occurs will be described. Then, a description will be made that the active matrix substrate 100A can prevent the occurrence of the flicker or the shadowing by securing the sufficient auxiliary capacitance value.

Figure 9:
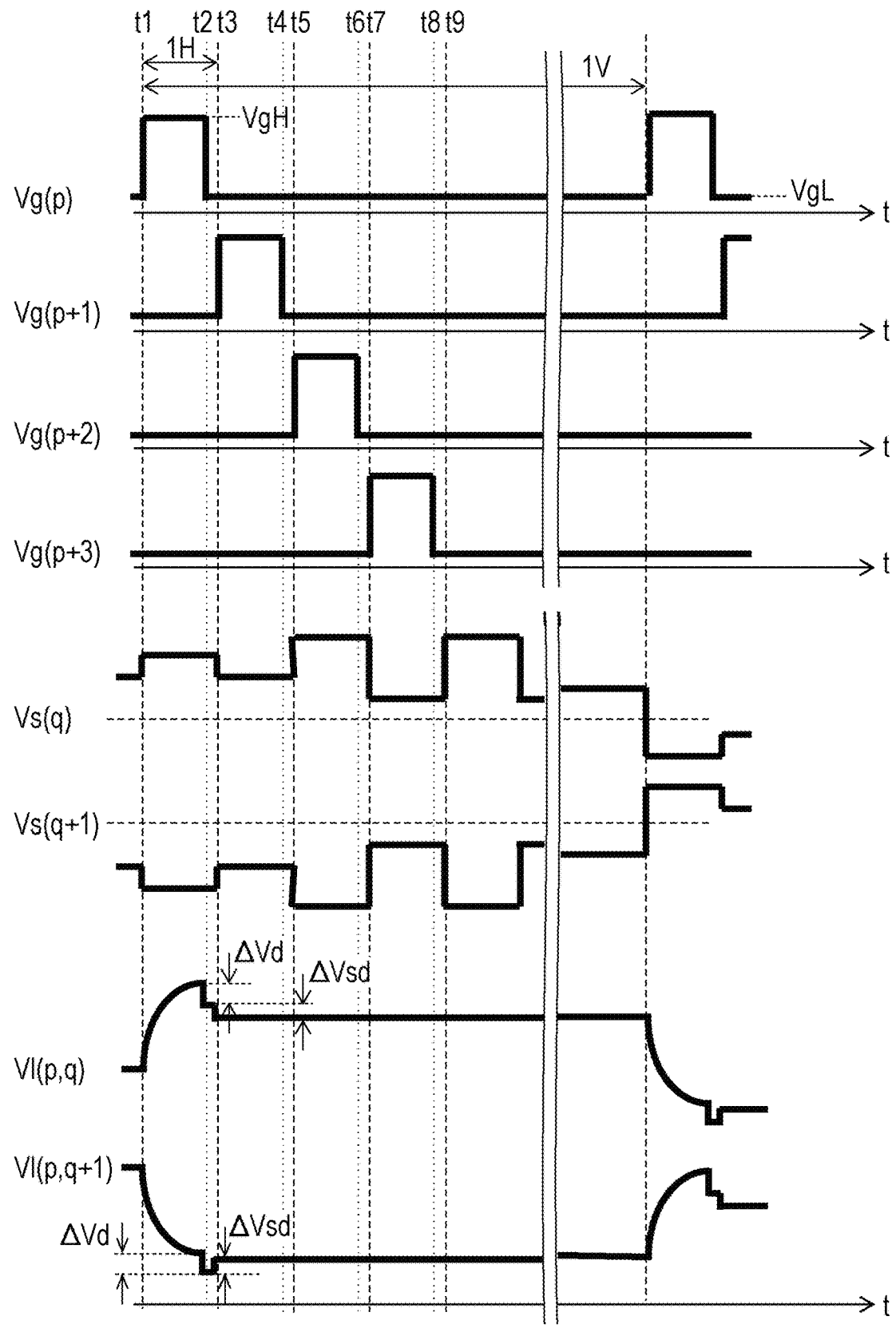
FIG. 9 is a diagram showing an example of waveforms of a scan signal voltage Vg and a display signal voltage Vs used for a drive of the liquid crystal display device including the active matrix substrate 100A.

The method of driving the liquid crystal display device including the active matrix substrate 100A will be described with reference to FIG. 9. FIG. 9 is a diagram showing an example of waveforms of a scan signal voltage Vg and a display signal voltage Vs used for driving the liquid crystal display device including the active matrix substrate 100A.

Note the p-th pixel row. The gate bus line G(p) is associated with the p-th pixel row. The TFT 10 of the pixel P included in the p-th pixel row is supplied with a scan signal voltage Vg(p) from the gate bus line G(p).

At time t1, the scan signal voltage Vg(p) changes from VgL (low) to VgH (high), and thus the TFT 10 of the pixel P included in the p-th pixel row is in a conductive state (on state), the pixel electrode 22a is supplied with the display signal voltage from the source bus line S, and the pixel capacitor is charged. The pixel capacitor includes the liquid crystal capacitor and the auxiliary capacitor CS1. A capacitance value C-Cpix of the pixel capacitor is represented as follows.

$$C\text{-}Cpix = C\text{-}Clc(V) + C\text{-}Ccs$$

Here, C-Clc(V) indicates the capacitance value of the liquid crystal capacitor, and depends on an effective voltage (V) applied to the liquid crystal layer of each pixel. C-Ccs indicates the capacitance value of the auxiliary capacitor.

At time t2, the scan signal voltage Vg(p) changes from VgH (high) to VgL (low), and thus the TFT 10 of the pixel P included in the p-th pixel row is in a non-conductive state (off state), and the pixel capacitor is electrically insulated from the source bus line S.

Immediately after time t2, the voltage of the pixel electrode 22a decreases by the amount of a pull-in voltage (also referred to as a field-through voltage) due to the pull-in phenomenon from the influence of the parasitic capacitance between the gate and the drain. The pull-in voltage ΔVd due to the influence of the capacitance between the gate and the drain is as the following expression.

$$\Delta Vd = C\text{-}Cgd/(C\text{-}Cpix + C\text{-}Cgd + C\text{-}Csd) \times (VgH - VgL)$$

Here, C-Cgd indicates the capacitance value of the parasitic capacitance between the gate and the drain, and C-Csd indicates the capacitance value of the parasitic capacitance between the source and the drain. The "parasitic capacitance between the gate and the drain" also includes the parasitic capacitance formed between the gate electrode and the pixel electrode electrically connected to the drain electrode, and the "parasitic capacitance between the source and the drain" includes the parasitic capacitance formed between the source electrode and the pixel electrode electrically connected to the drain electrode. VgH and VgL indicate the values of the scan signal voltage when the gate of the TFT is on and off, respectively. Further, in the present specification, "×" represents multiplication.

Further, a drain potential Vd changes by ΔVsd under the influence of the parasitic capacitance between the source and the drain. ΔVsd is represented by the following expression using a change amount ΔVs of the display signal voltage.

$$\Delta Vsd = C\text{-}Csd/(C\text{-}Cpix + C\text{-}Cgd + C\text{-}Csd) \times \Delta Vs$$

Therefore, assuming that the display signal voltage supplied from the source bus line S is set as the display signal voltage Vs, the voltage Vl(p, q) of the pixel electrode 22a of the pixel P connected to the gate bus line G(p) and the source bus line S(q) is as the following expression.

$$Vl(p,q) = Vs - \Delta Vd - \Delta Vsd$$

Here, the polarity of the display signal voltage supplied from each source bus line is constant in each vertical scanning period. In addition, the polarities of the display signal voltages supplied from the source bus lines adjacent to each other are opposite to each other in respective vertical scanning periods. That is, the polarity of the display signal voltage supplied to the source bus line S(q+1) adjacent to the source bus line S(q) is opposite to the polarity of the display signal voltage supplied to the source bus line S(q) in each vertical scanning period. The direction of change of the display signal voltages supplied to the source bus line S(q) and the source bus line S(q+1) (that is, the change amount ΔVs of the display signal voltage is positive or negative) is not necessarily the same. In addition, in a pixel electrode 22a of a certain pixel P, the parasitic capacitance is formed in not only the source bus line S associated with the certain pixel P, but also the adjacent source bus line S interposed between the source bus line S associated with the certain pixel P and the pixel electrode 22a. Since display signal voltages having opposite polarities are supplied to the source bus line S(q) and the source bus line S(q+1) that form parasitic capacitances with a certain pixel electrode 22a, the parasitic capacitances tend to cancel each other. However, the magnitude of the parasitic capacitance changes depending on the distance between the pixel electrode 22a and the source bus line S, the length of the portion where the pixel electrode 22a and the source bus line S are close, the presence or absence of a shield electrode layer, the magnitude of the display signal voltage, the change amount ΔVs of the display signal voltage, and the like. In addition, depending on the magnitude thereof, whether ΔVsd is positive or negative also changes.

The voltage Vl(p, q+1) of the pixel electrode 22a of the pixel P connected to the gate bus line G(p) and the source bus line S(q+1) is as the following expression.

$$Vl(p,q+1) = Vs - \Delta Vd + \Delta Vsd$$

Note that, for the reason described above, ΔVsd is not necessarily positive.

Thereafter, at time t3, the scan signal voltage Vg(p+1) changes from VgL (low) to VgH (high), and thus the TFT 10 of the pixel P included in the (p+1)-th pixel row is in the conductive state (on state), and the pixel electrode 22a is supplied with the display signal voltage from the source bus line S, and the pixel capacitor is charged. Similarly, all gate bus lines G are sequentially selected in each vertical scanning period (also referred to as a frame period).

Here, the polarity of the display signal voltage supplied to each source bus line S is inverted every vertical scanning period. FIG. 5A shows the polarity of the display signal voltage applied to each pixel in a certain vertical scanning period in a case where the liquid crystal display device including the active matrix substrate 100A is driven using various signal voltages shown in FIG. 9. As shown in FIG. 5A, in each vertical scanning period, the polarities of the display signal voltages supplied to the pixels adjacent to each other are opposite to each other.

Further, the "vertical scanning period (frame period)" means a period until a certain gate bus line is selected and then the gate bus line is selected. A difference (period) between the time of selecting a certain gate bus line and the time of selecting the next gate bus line in each vertical scanning period (frame period) is referred to as "one horizontal scanning period (1H)".

ΔVd generated under the influence of the parasitic capacitance may cause the flicker as described below. In addition, depending on a pattern to be displayed, as described below, a phenomenon called shadowing may occur due to ΔVsd. When ΔVd or C-Cgd/(C-Cpix+C-Cgd+C-Csd) is small, the influence on the flicker is small (since ΔVd is proportional to C-Cgd/(C-Cpix+C-Cgd+C-Csd)). In addition, when ΔVsd or C-Csd/(C-Cpix+C-Cgd+C-Csd) is small (since ΔVsd is proportional to C-Csd/(C-Cpix+C-Cgd+C-Csd)), even in a case of the shadowing occurring, the influence on the display quality is small. However, when the capacitance value C-Ccs of the auxiliary capacitor is smaller than the capacitance values C-Csd and C-Cgd of the parasitic capacitance, ΔVd and ΔVsd become large, and the influence on the display quality becomes large.

In the active matrix substrate 100A of the present embodiment, since each pixel P has the recess Rpa, and each pixel P is provided with the auxiliary capacitor CS1, it is possible to secure the sufficient auxiliary capacitance value while suppressing the decrease in the aperture ratio of the liquid crystal display device. Accordingly, it is possible to suppress the decrease in the display quality due to the flicker and the shadowing.

Here, the mechanism of causing the flicker will be described.

As described above, the voltage of the pixel electrode (a potential of the pixel electrode with respect to a ground level) changes in the specific direction (in the case of the present embodiment, a negative side) by ΔVd regardless of the polarity of the display signal voltage. At this time, in a case where the voltage (potential) of the counter electrode is at the ground level, the voltage applied to the liquid crystal layer (the difference between the potential of the pixel electrode and the potential of the counter electrode) differs depending on the polarity of the display signal voltage. Specifically, the voltage applied to the liquid crystal layer is smaller in a case where the polarity of the display signal voltage is positive than in a case where the polarity of the display signal voltage is negative. Furthermore, since the liquid crystal has the dielectric anisotropy, the liquid crystal capacitor C-Clc (V) varies depending on the display (alignment state of liquid crystal molecules). Therefore, the size of ΔVd also varies according to the display signal voltage.

The flicker, that is, the display flicker caused by as described above, may occur; however, with respect to the flicker, for example, the occurrence of the flicker can be suppressed by correcting the voltage (potential) of the counter electrode or correcting the display signal voltage in advance.

However, even when the correction as described above is performed, the flicker may still occur. This is because, for example, ΔVd varies due to the bluntness of the scan signal voltage, an irregularity of the thickness (cell thickness) of the liquid crystal layer, or the like, which may cause the irregularity of ΔVd.

Next, the mechanism of causing the shadowing occurs will be described.

FIGS. 10(a) and 10(b) are views for describing the shadowing in a normally black mode (for example, the VA mode). FIG. 10(a) shows a display screen when the pattern shown in FIG. 10(b) is displayed on the liquid crystal display device in the normally black mode. The pattern shown in FIG. 10(b) is a display pattern (also referred to as a window pattern) which has a region A with a high luminance at a center portion, and has a region with a low luminance around the region A (regions B and C), and in which white is displayed in the region A, and gray (gray levels) with the lower luminance than region A is displayed in the regions B and C. The region B is a display region in upper and lower sides of the region A (the direction parallel to the column direction is set as the up and down direction), and the region C is a display region in the right and left of the region A (the direction parallel to the row direction is set as the right and left direction). The region B is a region that should be displayed in the same manner as the region C in the first place. However, as described above, under the influence of the parasitic capacitance between the source and the drain based on the display signal voltage in the period for displaying the region A, the effective value of the drain potential Vd of the pixel in the region B becomes large, as a result, the gray scale of the region B increases (the gray becomes higher in luminance than the region C), and as shown in FIG. 10(a), and an image appears, which seems that the shadow of a white square displayed in the region A is reflected in the region B.

Although the liquid crystal display device in the normally black mode is described as an example in FIG. 10, the shadowing similarly also occurs in a case where the normally white mode (the white display when no voltage is applied; for example, the TN mode) is adopted. For example, shadowing occurs because the gray scale of the upper and lower portions of the black display portion reduces (the gray becomes lower in luminance).

The above description does not necessarily apply to the luminance of the region B. Depending on the configuration of the pixel, the luminance may be high or low.

The effects of the active matrix substrate 100A of the present embodiment will be described in comparison with the active matrix substrate of PTL 1.

The active matrix substrate included in the liquid crystal display device of PTL 1 has the triple gate structure as in the active matrix substrate of the present embodiment, but differs from the active matrix substrate of the present embodiment in the configuration of the auxiliary capacitor.

The active matrix substrate of PTL 1 does not have the two-layer electrode structure. The auxiliary capacitor included in each pixel of the active matrix substrate of PTL 1 is constituted by the auxiliary capacitor electrode formed in a gate metal layer, the pixel electrode, and the insulating layer positioned therebetween. In the active matrix substrate of PTL 1, since the auxiliary capacitor electrode is formed to overlap the pixel electrode, it is possible to decrease the aperture ratio of the liquid crystal display device by forming the auxiliary capacitor electrode to be large. In addition, since the active matrix substrate of PTL 1 2 does not have the two-layer electrode structure, the auxiliary capacitance value may not be sufficient from the viewpoint of suppressing the occurrence of the flicker or the shadowing.

The effects of the active matrix substrate 100A of the present embodiment will be described in comparison with an active matrix substrate of a reference example.

Figure 11:
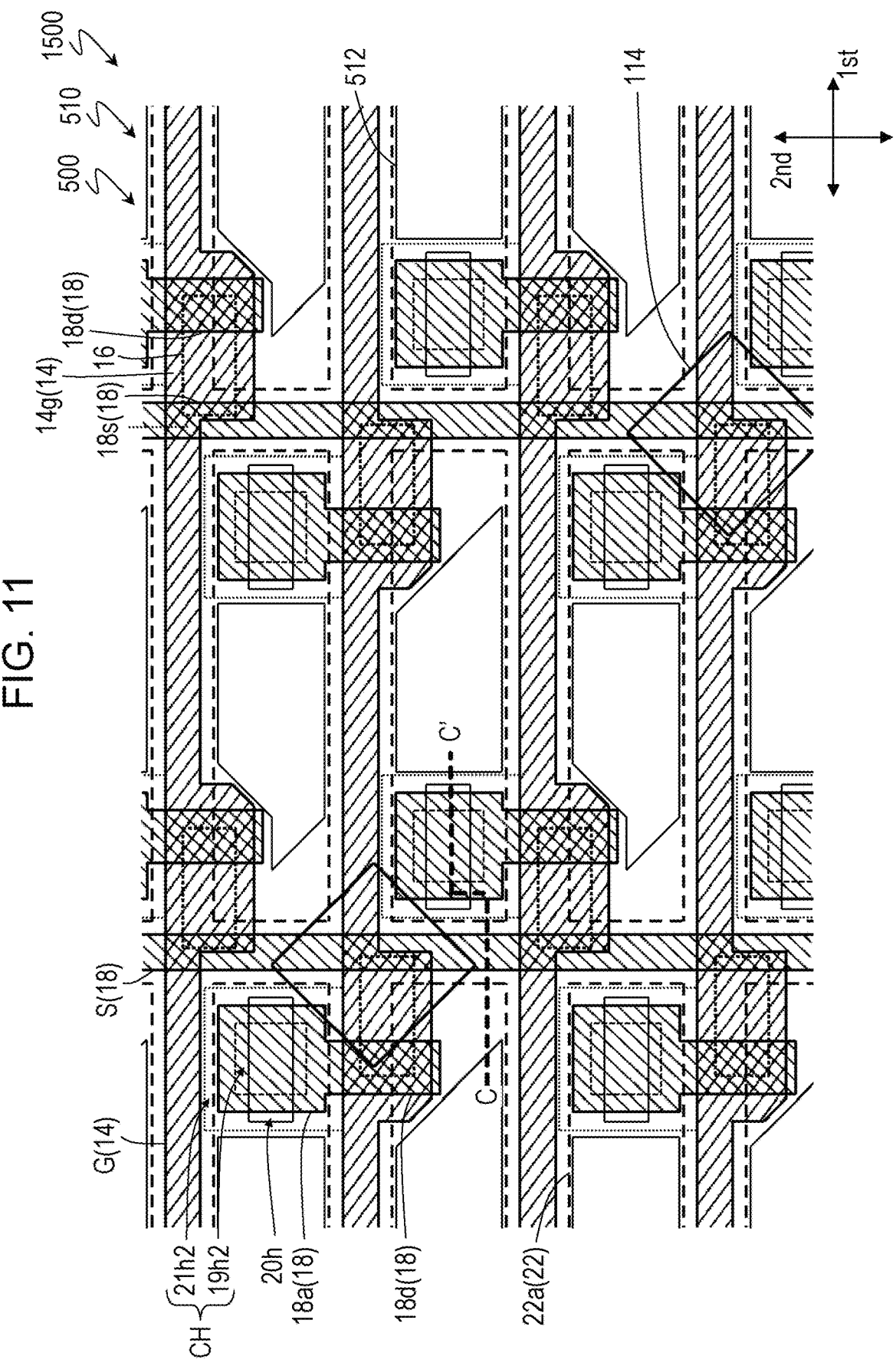
FIG. 11 is a plan view schematically showing a liquid crystal display device 1500 including an active matrix substrate 500 of a reference example.
Figure 12:
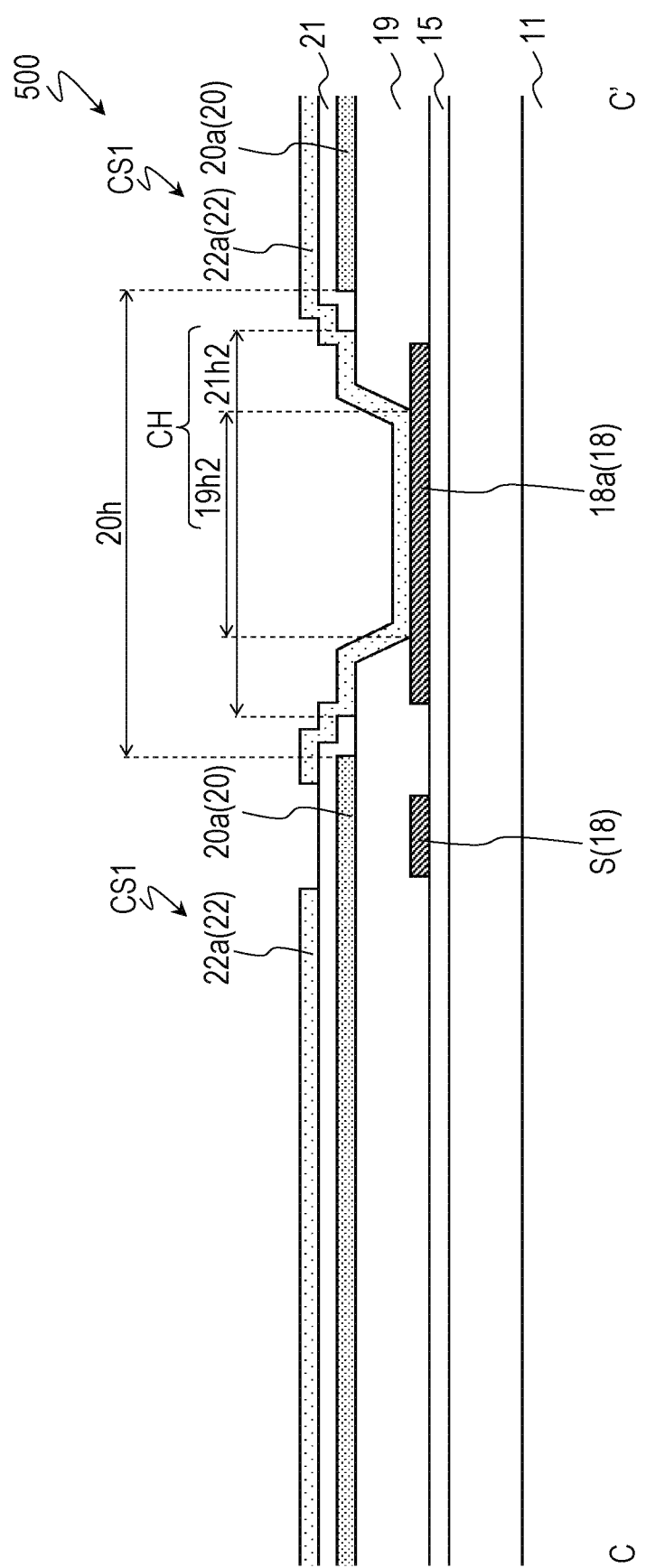
FIG. 12 is a sectional view schematically showing the active matrix substrate 500, and shows a sectional structure of the active matrix substrate 500 taken along the line C-C' in FIG. 11.

FIG. 11 is a plan view schematically showing a liquid crystal display device 1500 including an active matrix substrate 500 of the reference example, and FIG. 12 is a sectional view schematically showing the active matrix substrate 500. FIG. 12 shows a sectional structure of the active matrix substrate 500 taken along the line C-C' in FIG. 11. The liquid crystal display device 1500 includes the active matrix substrate 500, a counter substrate 510, and the liquid crystal layer (not shown).

As shown in FIGS. 11 and 12, the active matrix substrate 500 of the reference example does not have the recess RPa, which differs from the active matrix substrate 100A of the present embodiment. The active matrix substrate 500 of the reference example has smaller areas of the first transparent electrode 20a and the pixel electrode 22a that constitute the auxiliary capacitor CS1 than the active matrix substrate 100A of the present embodiment. Therefore, the active matrix substrate 500 of the reference example has the smaller capacitance value of the auxiliary capacitor CS1 than the active matrix substrate 100A of the present embodiment.

The active matrix substrate 500 of Reference Example 1 has the auxiliary capacitor CS1 formed by the two-layer electrode structure. Therefore, the active matrix substrate 500 of the reference example has the advantage of being able to secure the auxiliary capacitance value while suppressing the decrease in the aperture ratio, in comparison with the active matrix substrate of PTL 1.

Note that, in the active matrix substrate 500 of the reference example, the auxiliary capacitance value of each pixel may not be sufficient. For example, when the pixel pitch of the active matrix substrate becomes small, the ratio of an area of the opening 20h of the first transparent conductive layer 20 to an area of the pixel P increases, and the capacitance value of the auxiliary capacitor CS1 becomes small with respect to the capacitance value of the pixel capacitor. In this case, it may not be possible to secure the sufficient auxiliary capacitance value. Such a problem tends to occur particularly in the active matrix substrate used for the high resolution liquid crystal display device. For example, when the liquid crystal display device having the active matrix substrate of the present embodiment is set as a 2.6 type (2.6 inch) full high definition (FHD) panel, the number of pixels is (1080×3) rows×1920 columns, the pixel pitch in the row direction (Px in FIG. 1) is 30 μm, and the pixel pitch in the column direction (Py in FIG. 1) is 10 μm (approximately 847 ppi). In such a small size type, the high resolution liquid crystal display device is suitably used, for example, in a head mounted display.

The active matrix substrate 100A of the present embodiment can secure the auxiliary capacitance value while suppressing the decrease in the aperture ratio of the liquid crystal display device more effectively than the active matrix substrate of the reference example. The active matrix substrate 100A of the present embodiment has the two-layer electrode structure and each pixel is provided with the recess RPa. Furthermore, in each pixel, the recess RPa is formed adjacent to the TFT 10. Since the region around the TFT 10 is often covered with the light shielding layer (black matrix), a decrease in aperture ratio due to the provision of the recess RPa is suppressed. The active matrix substrate 100A can secure the auxiliary capacitance value while suppressing the decrease in the aperture ratio of the liquid crystal display device. Therefore, the active matrix substrate 100A can improve the display quality while suppressing the decrease in the aperture ratio of the liquid crystal display device.

The semiconductor layer 16 included in the active matrix substrate 100A may be an oxide semiconductor layer. The oxide semiconductor included in the oxide semiconductor layer may be an amorphous oxide semiconductor or a crystalline oxide semiconductor having a crystalline portion. Examples of the crystalline oxide semiconductor include a polycrystalline oxide semiconductor, a microcrystalline oxide semiconductor, a crystalline oxide semiconductor in which the c-axis is oriented substantially perpendicularly to the layer surface, and the like.

The oxide semiconductor layer may have a laminated structure of two or more layers. In a case where the oxide semiconductor layer has the stacked structure, the oxide semiconductor layer may include an amorphous oxide semiconductor layer and a crystalline oxide semiconductor layer. Alternatively, a plurality of crystalline oxide semiconductor layers having different crystal structures may be included. In addition, a plurality of amorphous oxide semiconductor layers may be included. In a case where the oxide semiconductor layer has the two-layer structure including the upper layer and the lower layer, an energy gap of the oxide semiconductor included in the upper layer is preferably larger than the energy gap of the oxide semiconductor included in the lower layer. However, in a case where the difference in energy gap between these layers is comparatively small, the energy gap of the lower layer oxide semiconductor may be larger than the energy gap of the upper layer oxide semiconductor.

Japanese Unexamined Patent Application Publication No. 2014-007399 discloses, for example, a material, a structure, and a film formation method of the amorphous oxide semiconductor and each crystalline oxide semiconductor, and a configuration of the oxide semiconductor layer having the stacked structure. The entire disclosure of Japanese Unexamined Patent Application Publication No. 2014-007399 is incorporated herein by reference.

The oxide semiconductor layer may include, for example, at least one type of metal element among In, Ga, and Zn. In the present embodiment, the oxide semiconductor layer contains, for example, an In—Ga—Zn—O-based semiconductor (for example, indium gallium zinc oxide). Here, the In—Ga—Zn—O-based semiconductor is a ternary oxide of Indium (In), Gallium (Ga), and Zinc (Zn), the ratio (the composition ratio) of In, Ga, and Zn is not particularly limited, and the examples thereof include In:Ga:Zn=2:2:1, In:Ga:Zn=1:1:1, and In:Ga:Zn=1:1:2. Such an oxide semiconductor layer may be formed of an oxide semiconductor film that contains the In—Ga—Zn—O-based semiconductor.

The In—Ga—Zn—O-based semiconductor may be amorphous and may be crystalline. As the crystalline In—Ga—Zn—O-based semiconductor, the crystalline In—Ga—Zn—O-based semiconductor in which the c-axis substantially aligns vertically to the layer surface is preferable.

Further, the crystal structure of the crystalline In—Ga—Zn—O-based semiconductor, for example, is disclosed in the above-described Japanese Unexamined Patent Application Publication Nos. 2014-007399, 2012-134475, 2014-209727, and the like. The entire disclosure of Japanese Unexamined Patent Application Publication Nos. 2012-134475 and 2014-209727 is incorporated in the present specification by reference. A TFT that has an In-GA-Zn—O-based semiconductor layer has a high mobility (which is more than 20 times that of an a-Si TFT) and a low leak current (which is less than one-hundredth of that of the a-Si TFT), and thus can be suitably used as a drive TFT (for example, a TFT included in a drive circuit which is provided on the same substrate as the display region around the display region including the plurality of pixels) and the pixel TFT (the TFT that is provided in the pixel).

The oxide semiconductor layer may contain the other oxide semiconductor instead of the In—Ga—Zn—O-based semiconductor. For example, an In—Sn—Zn—O-based semiconductor (for example, $In_2O_3$—$SnO_2$—ZnO; InSnZnO) may be included. The In—Sn—Zn—O-based semiconductor is the ternary oxide of Indium (In), Tin (Sn), and Zinc (Zn).

Alternatively, the oxide semiconductor layer may include an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, a cadmium oxide (CdO), a Mg—Zn—O-based semiconductor, an In—Ga—Sn—O-based semiconductor, an In—Ga—O-based semiconductor, a Zr—In—Zn—O-based semiconductor, a Hf—In—Zn—O-based semiconductor, an Al—Ga—Zn—O-based semiconductor, a Ga—Zn—O-based semiconductor, or the like.

Modification Example 1

Figure 13:
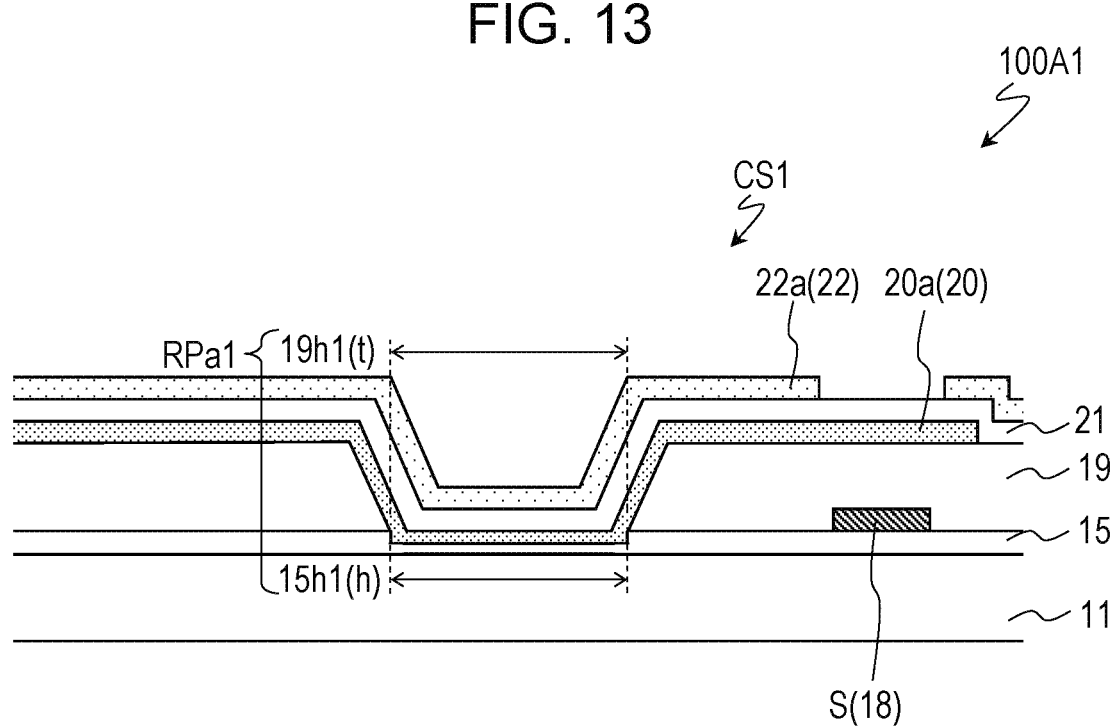
FIG. 13 is a sectional view schematically showing an active matrix substrate 100A1 of Modification Example 1 of Embodiment 1.

An active matrix substrate of Modification Example 1 of the present embodiment will be described with reference to FIG. 13. FIG. 13 is a sectional view schematically showing an active matrix substrate 100A1 of Modification Example 1 of the present embodiment.

The recess RPa included in each pixel P of the active matrix substrate 100A is constituted by the hole 19h1(t) formed in the interlayer insulating layer 19 and the hole 15h1(t) formed in the gate insulating layer 15. In contrast, as shown in FIG. 13, a recess RPa1 included in each pixel of the active matrix substrate 100A1 is constituted by the hole 19h1(t) formed in the interlayer insulating layer 19 and a hole 15h1(h) formed in the gate insulating layer 15. That is, the hole 15h1 formed in the gate insulating layer 15 is a hollow which does not penetrate.

Also in the active matrix substrate 100A1 having such a structure, the same effect as that of the active matrix substrate 100A can be obtained.

In the manufacturing steps of the active matrix substrate 100A1, for example, the etching time of the gate insulation film for forming the gate insulating layer 15 may be shorter than the manufacturing step of the active matrix substrate 100A.

Modification Example 2

Figure 14:
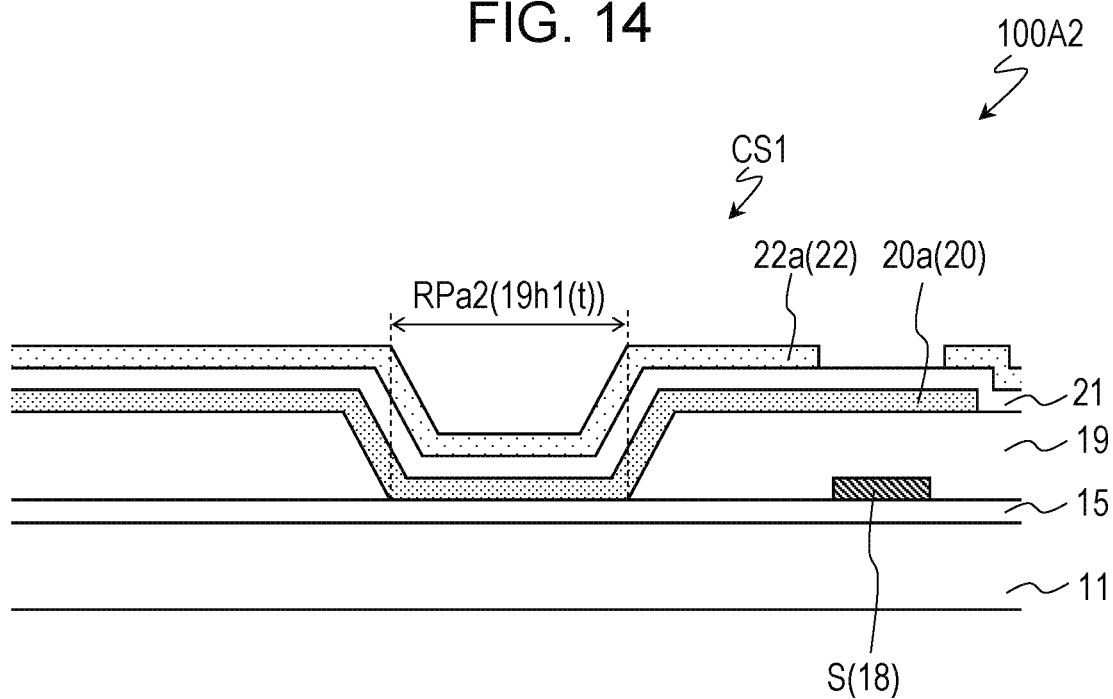
FIG. 14 is a sectional view schematically showing an active matrix substrate 100A2 of Modification Example 2 of Embodiment 1.

An active matrix substrate of Modification Example 2 of the present embodiment will be described with reference to FIG. 14. FIG. 14 is a sectional view schematically showing an active matrix substrate 100A2 of Modification Example 2 of the present embodiment.

The recess RPa included in each pixel P of the active matrix substrate 100A is constituted by the hole 19h1(t) formed in the interlayer insulating layer 19 and the hole 15h1(t) formed in the gate insulating layer 15. In contrast, as shown in FIG. 14, a recess RPa2 included in each pixel of the active matrix substrate 100A2 is constituted by only the hole 19h1(t) formed in the interlayer insulating layer 19.

That is, in the gate insulating layer 15, the hole that constitutes the recess RPa2 is not formed.

Also in the active matrix substrate 100A2 having such a structure, the same effect as that of the active matrix substrate 100A can be obtained.

Modification Example 3

Figure 15:
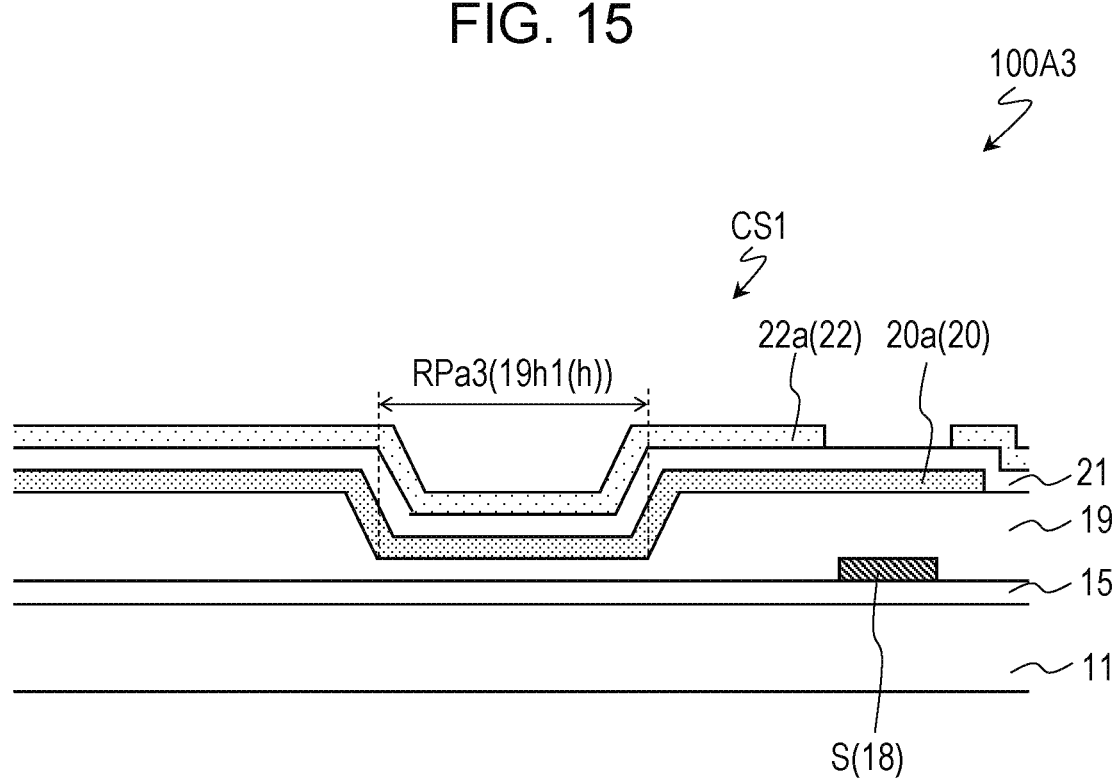
FIG. 15 is a sectional view schematically showing an active matrix substrate 100A3 of Modification Example 3 of Embodiment 1.

An active matrix substrate of Modification Example 3 of the present embodiment will be described with reference to FIG. 15. FIG. 15 is a sectional view schematically showing an active matrix substrate 100A3 of Modification Example 3 of the present embodiment.

The recess RPa included in each pixel P of the active matrix substrate 100A is constituted by the hole 19$h$1($t$) formed in the interlayer insulating layer 19 and the hole 15$h$1($t$) formed in the gate insulating layer 15. In contrast, as shown in FIG. 15, a recess RPa3 included in each pixel of the active matrix substrate 100A3 is constituted by only a hole 19$h$1($h$) formed in the interlayer insulating layer 19. That is, in the gate insulating layer 15, the hole that constitutes the recess RPa3 is not formed, and the hole 19$h$1 formed in the interlayer insulating layer 19 is a hollow that does not penetrate.

Also in the active matrix substrate 100A3 having such a structure, the same effect as that of the active matrix substrate 100A can be obtained.

When the interlayer insulating layer 19 includes an inorganic insulating layer and an organic insulating layer formed on the inorganic insulating layer, the hole 19$h$1 may be formed only in the organic insulating layer.

Modification Example 4

Figure 16:
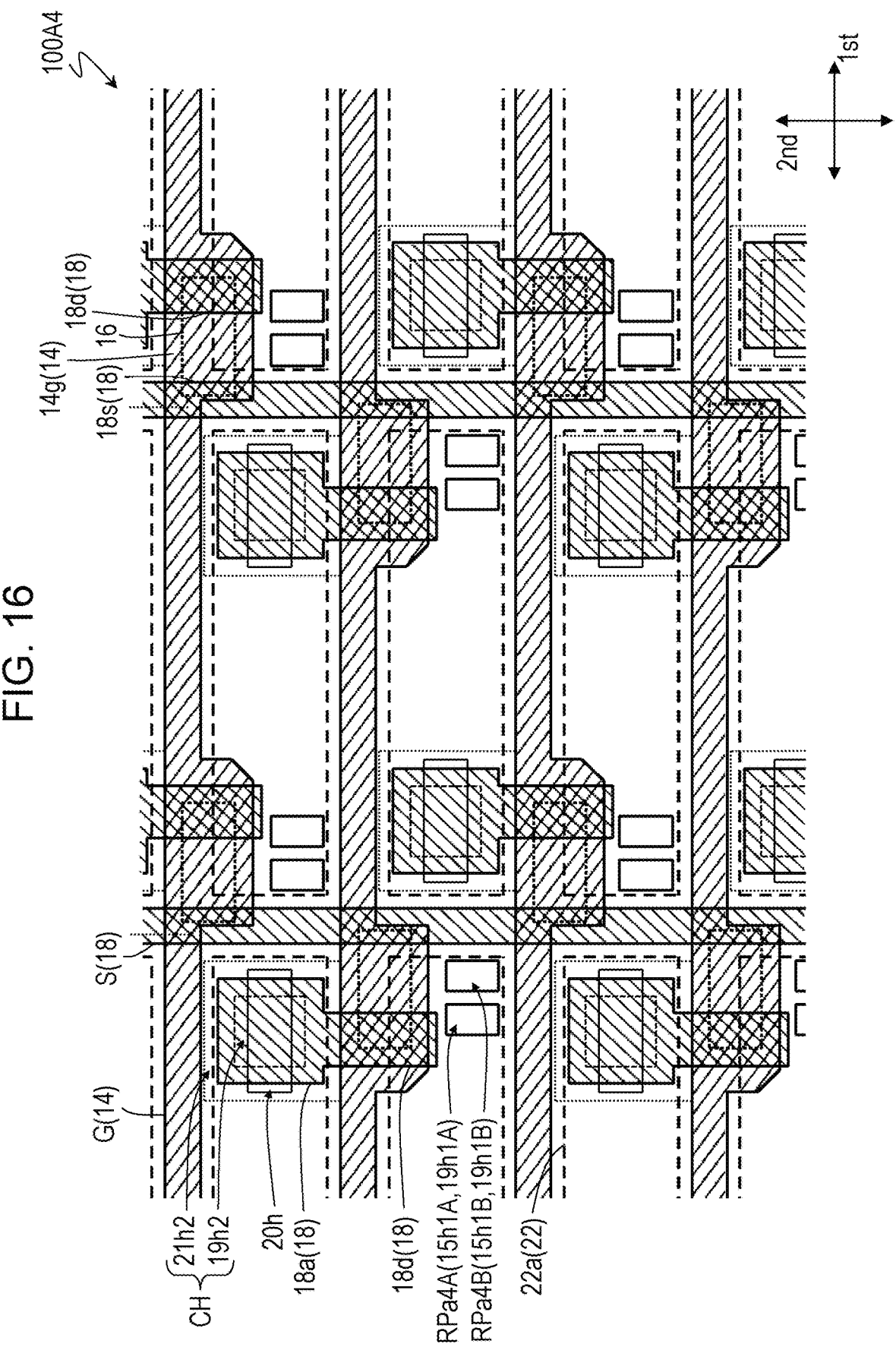
FIG. 16 is a plan view schematically showing an active matrix substrate 100A4 of Modification Example 4 of Embodiment 1.

An active matrix substrate of Modification Example 4 of the present embodiment will be described with reference to FIG. 16. FIG. 16 is a plan view schematically showing an active matrix substrate 100A4 of Modification Example 4 of the present embodiment.

The active matrix substrate 100A4 has two recesses RPa4A and RPa4B in each pixel P, which differs from the active matrix substrate 100A.

Also in the active matrix substrate 100A4 having such a structure, the same effect as that of the active matrix substrate 100A can be obtained.

When each pixel P has a plurality of recesses, the sum of the areas of the side surface and the bottom surfaces of the recess can be increased. Accordingly, the active matrix substrate 100A4 can obtain the auxiliary capacitor CS1 having a large capacitance value by having the two recesses RPa4A and RPa4B.

In the illustrated example, the recess RPa4A has a hole 19$h$1A formed in the interlayer insulating layer 19 and a hole 15$h$1A formed in the gate insulating layer 15, and the recess RPa4B has a hole 19$h$1B formed in the interlayer insulating layer 19 and a hole 15$h$1B formed in the gate insulating layer 15. The recesses RPa4A and RPa4B are not limited to the illustrated example, and may each independently have the same structure as the recess RPa included in the active matrix substrate 100A of the present embodiment, or the same structure as any of the recesses RPa1, RPa2, and RPa3 included in the active matrix substrates 100A1, 100A2, and 100A3 of Modification Examples 1 to 3 of the present embodiment. Note that, it is preferable from the viewpoint of manufacturing cost that the recesses RPa4A and RPa4B have the same structure.

The shape and the number of the recesses included in each pixel P are not limited to those illustrated, and each of the plurality of pixels may have at least one recess.

Embodiment 2

An active matrix substrate of the present embodiment further has an upper metal layer 24 that is in direct contact with the first transparent conductive layer 20 or the second transparent conductive layer 22 and that contains metal.

Figure 17:
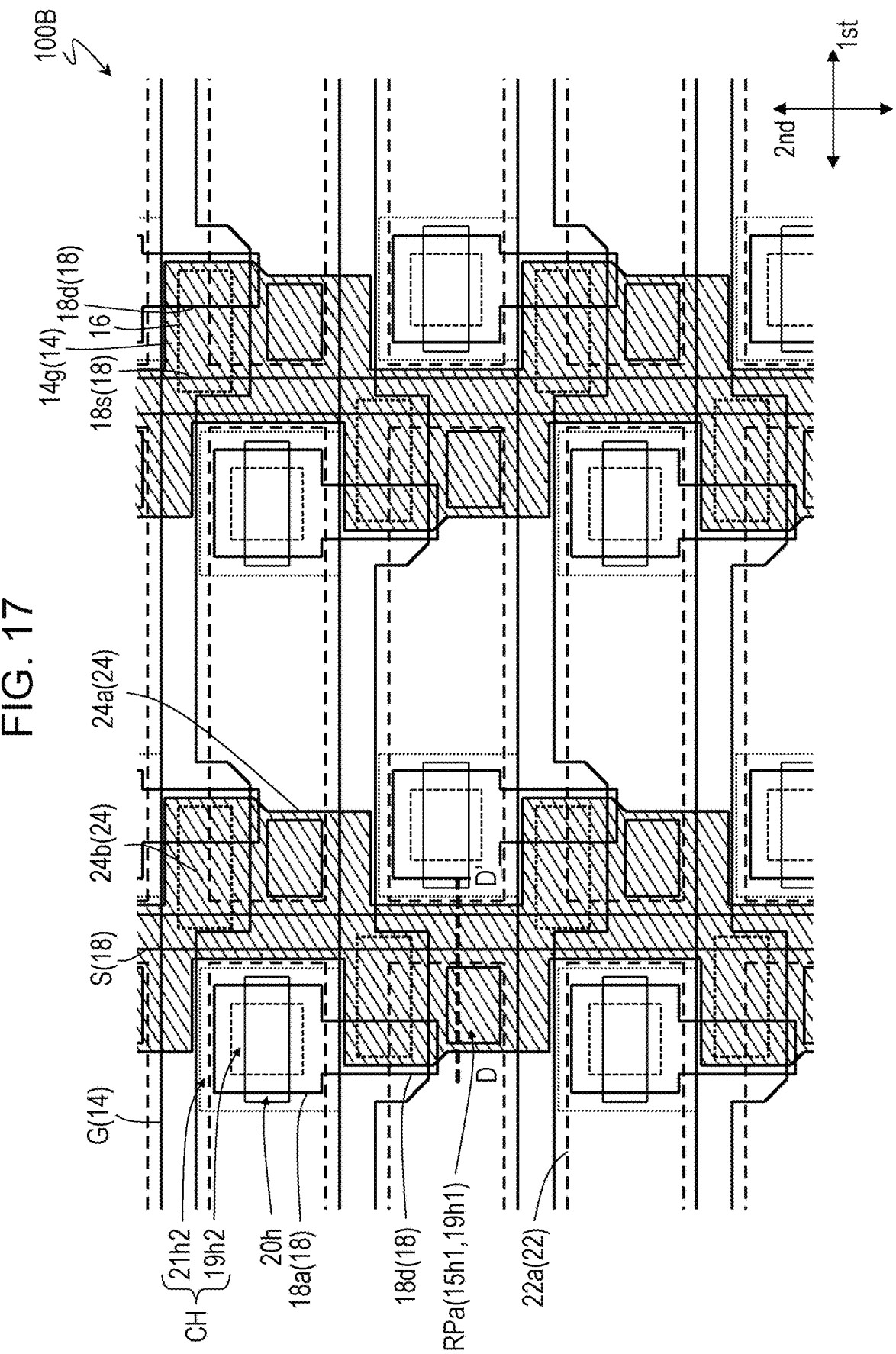
FIG. 17 is a plan view schematically showing an active matrix substrate 100B according to Embodiment 2 of the present invention, in which an upper metal layer 24 is hatched.
Figure 18:
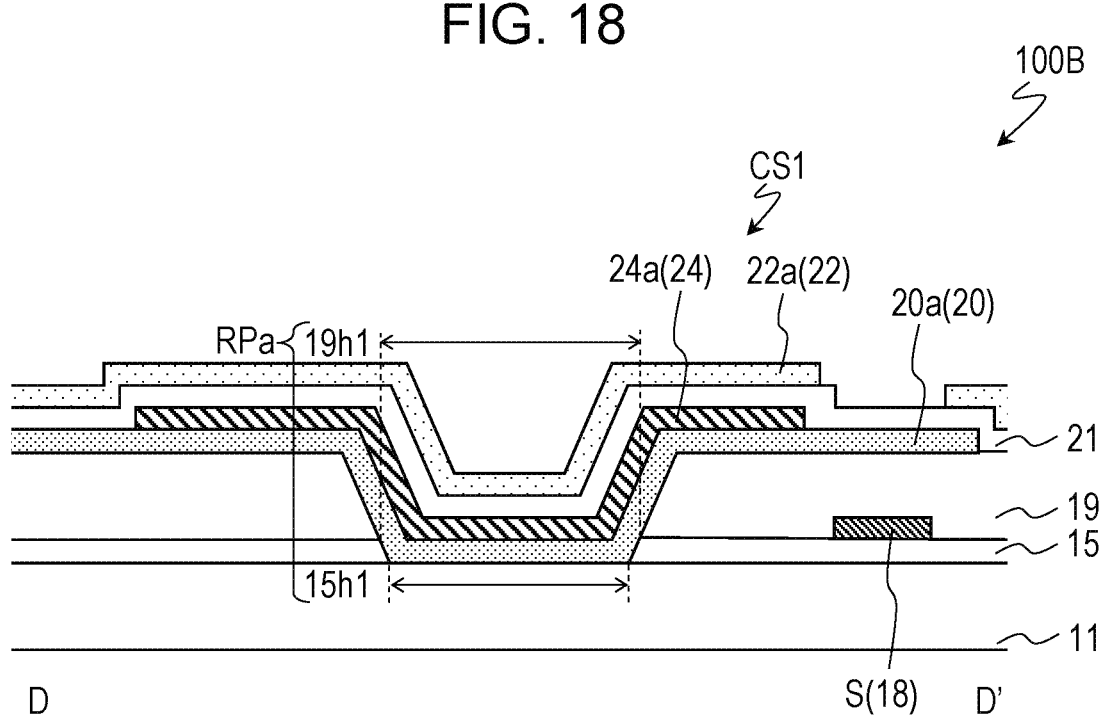
FIG. 18 is a sectional view schematically showing the active matrix substrate 100B, and shows a sectional structure taken along the line D-D' in FIG. 17.

FIGS. 17 and 18 show an active matrix substrate 100B in the present embodiment. FIG. 17 is a plan view schematically showing the active matrix substrate 100B, and FIG. 18 is a sectional view schematically showing the active matrix substrate 100B. FIG. 18 shows a sectional structure taken along the line D-D' in FIG. 17. FIG. 17 is a view in which the upper metal layer 24 is hatched. The following description will focus on differences between the active matrix substrate 100B and the active matrix substrate 100A in Embodiment 1.

The active matrix substrate 100B further has the upper metal layer 24 that is in direct contact with the first transparent conductive layer 20 or the second transparent conductive layer 22 and that contains metal, which differs from the active matrix substrate 100A.

The active matrix substrate 100B has the two-layer electrode structure and each pixel is provided with the recess RPa. Furthermore, in each pixel, the recess RPa is formed adjacent to the TFT 10. Since the region around the TFT 10 is often covered with the light shielding layer (black matrix), a decrease in aperture ratio due to the provision of the recess RPa is suppressed. The active matrix substrate 100B can secure the auxiliary capacitance value while suppressing the decrease in the aperture ratio of the liquid crystal display device. Therefore, the active matrix substrate 100B can improve the display quality while suppressing the decrease in the aperture ratio of the liquid crystal display device.

The upper metal layer 24 is formed on the source metal layer 18. Here, the upper metal layer 24 is formed between the first transparent conductive layer 20 and the inorganic insulating layer 21.

The upper metal layer 24 may have the single-layer structure or the stacked structure in which the plurality of layers are stacked. The upper metal layer 24 includes at least a layer formed of the metal material. In a case where the upper metal layer 24 has the stacked structure, some layers may be formed of the metal nitride or the metal oxide. The upper metal layer 24 is formed of, for example, any of the metal such as aluminum (Al), tungsten (W), molybdenum (Mo), tantalum (Ta), chromium (Cr), titanium (Ti), and copper (Cu), the alloy containing the above-described metal, and the nitride thereof.

The upper metal layer 24 includes a portion 24$a$ covering the recess Rpa when viewed in a normal direction of the substrate 11. Since the portion 24$a$ is in direct contact with the first transparent electrode 20$a$ formed in the recess RPa, the first transparent electrode 20$a$ has a redundancy. Even when a disconnection (discontinuous portion) in the recess Rpa occurs in the first transparent electrode 20$a$, the operation of the active matrix substrate 100B is not disturbed, and thus the manufacturing yield can be improved.

In addition, since the upper metal layer 24 is in direct contact with the first transparent conductive layer 20, the resistance and the resistance distribution of the first transparent conductive layer 20 can be reduced. As a result, the occurrence of shadowing and the like can be suppressed, and the display quality of the liquid crystal display device can be improved.

Since the portion 24a of the upper metal layer 24 is formed to cover the recess RPa, a decrease in aperture ratio due to the provision of the portion 24a is suppressed.

The upper metal layer 24 preferably further includes a portion 24b covering the channel region 16c of the semiconductor layer 16 of the TFT 10 when viewed in a normal direction of the substrate 11. Since the portion 24b functions as a light shielding film for the channel region 16c, the amount of allowable misalignment between the active matrix substrate 100B and the counter substrate (black matrix) is large. Therefore, the active matrix substrate 100B can improve the manufacturing yield.

The upper metal layer 24 in direct contact with the first transparent conductive layer 20 is formed not to overlap the entire opening 19h2 of the interlayer insulating layer 19 when viewed in a normal direction of the substrate 11. The upper metal layer 24 in direct contact with the first transparent conductive layer 20 is preferably formed not to overlap the contact hole CH when viewed in a normal direction of the substrate 11.

Modification Example 1

Figure 19:
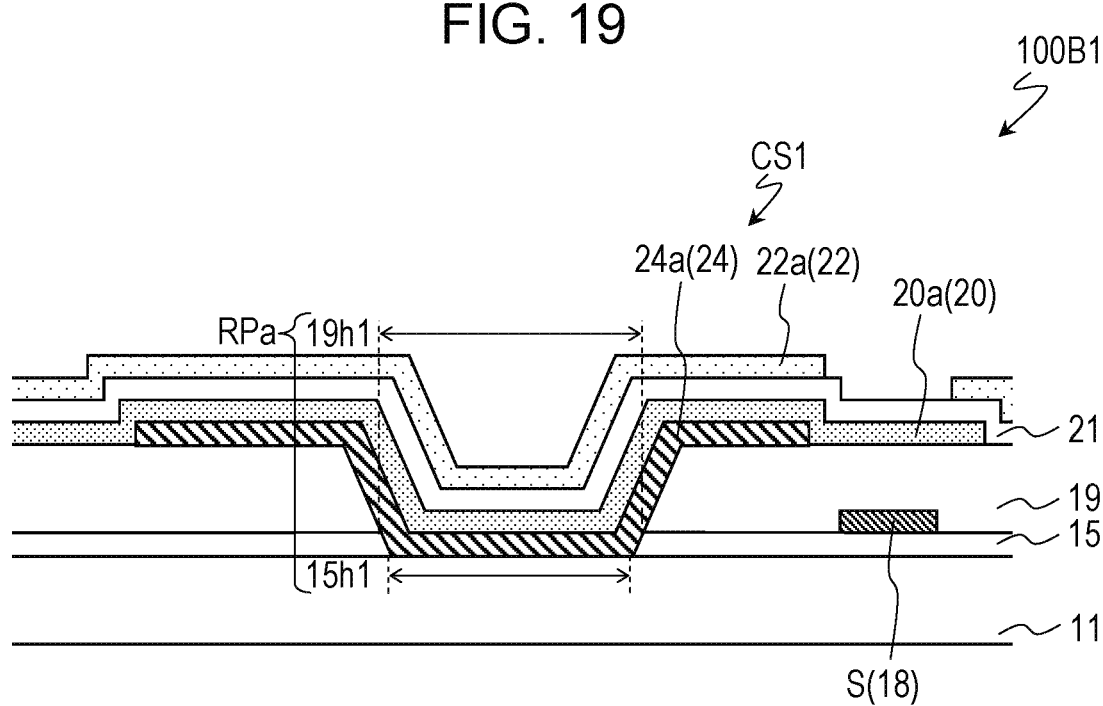
FIG. 19 is a sectional view schematically showing an active matrix substrate 100B1 of Modification Example 1 of Embodiment 2.

An active matrix substrate of Modification Example 1 of the present embodiment will be described with reference to FIG. 19. FIG. 19 is a sectional view schematically showing an active matrix substrate 100B1 of Modification Example 1 of the present embodiment.

In the active matrix substrate 100B, the upper metal layer 24 is formed between the first transparent conductive layer 20 and the inorganic insulating layer 21. In contrast, in the active matrix substrate 100B1, as shown in FIG. 19, the upper metal layer 24 is formed between the first transparent conductive layer 20 and the interlayer insulating layer 19.

Also in the active matrix substrate 100B1 having such a structure, the same effect as that of the active matrix substrate 100B can be obtained.

Modification Example 2

Figure 20:
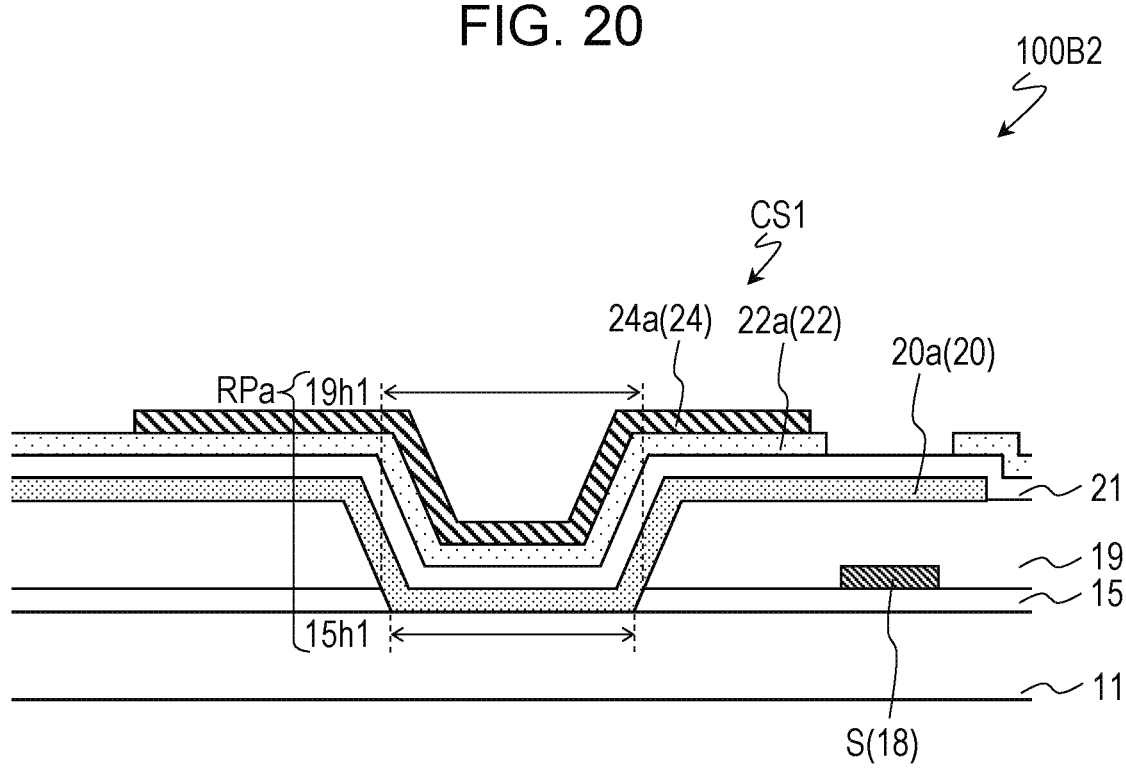
FIG. 20 is a sectional view schematically showing an active matrix substrate 100B2 of Modification Example 2 of Embodiment 2.

An active matrix substrate of Modification Example 2 of the present embodiment will be described with reference to FIG. 20. FIG. 20 is a sectional view schematically showing an active matrix substrate 100B2 of Modification Example 1 of the present embodiment.

In the active matrix substrate 100B, the upper metal layer 24 is formed between the first transparent conductive layer 20 and the inorganic insulating layer 21. In contrast, in the active matrix substrate 100B2, as shown in FIG. 20, the upper metal layer 24 is formed on the second transparent conductive layer 22 and in direct contact with the second transparent conductive layer 22.

Also in the active matrix substrate 100B2 having such a structure, the same effect as that of the active matrix substrate 100B can be obtained.

The upper metal layer 24 in direct contact with the second transparent conductive layer 22 may be formed to cover the contact hole CH when viewed in a normal direction of the substrate 11.

Modification Example 3

An active matrix substrate of Modification Example 3 of the present embodiment has the structure that the upper metal layer 24 is formed between the second transparent conductive layer 22 and the inorganic insulating layer 21, which differs from the active matrix substrate 100B2 of Modification Example 2 of the present embodiment.

Also in the active matrix substrate having such a structure, the same effect as that of the active matrix substrate 100B can be obtained.

Embodiment 3

The active matrix substrate of the present embodiment further has a lower metal layer 12 formed below the gate metal layer 14 and a lower insulating layer 13 formed between the gate metal layer 14 and the lower metal layer 12.

Figure 21:
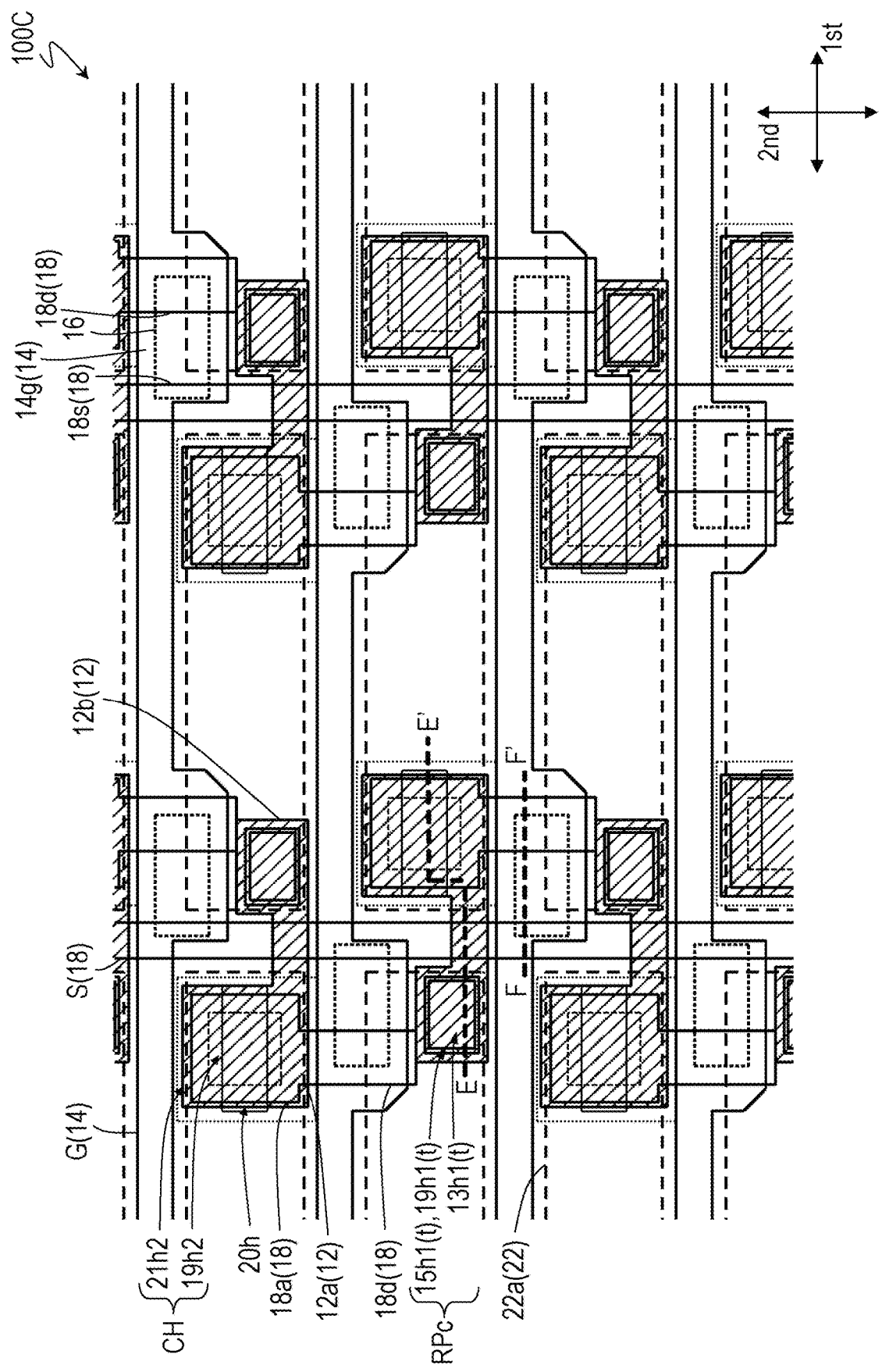
FIG. 21 is a plan view schematically showing an active matrix substrate 100C according to Embodiment 3 of the present invention, in which a lower metal layer 12 is hatched.
Figure 22:
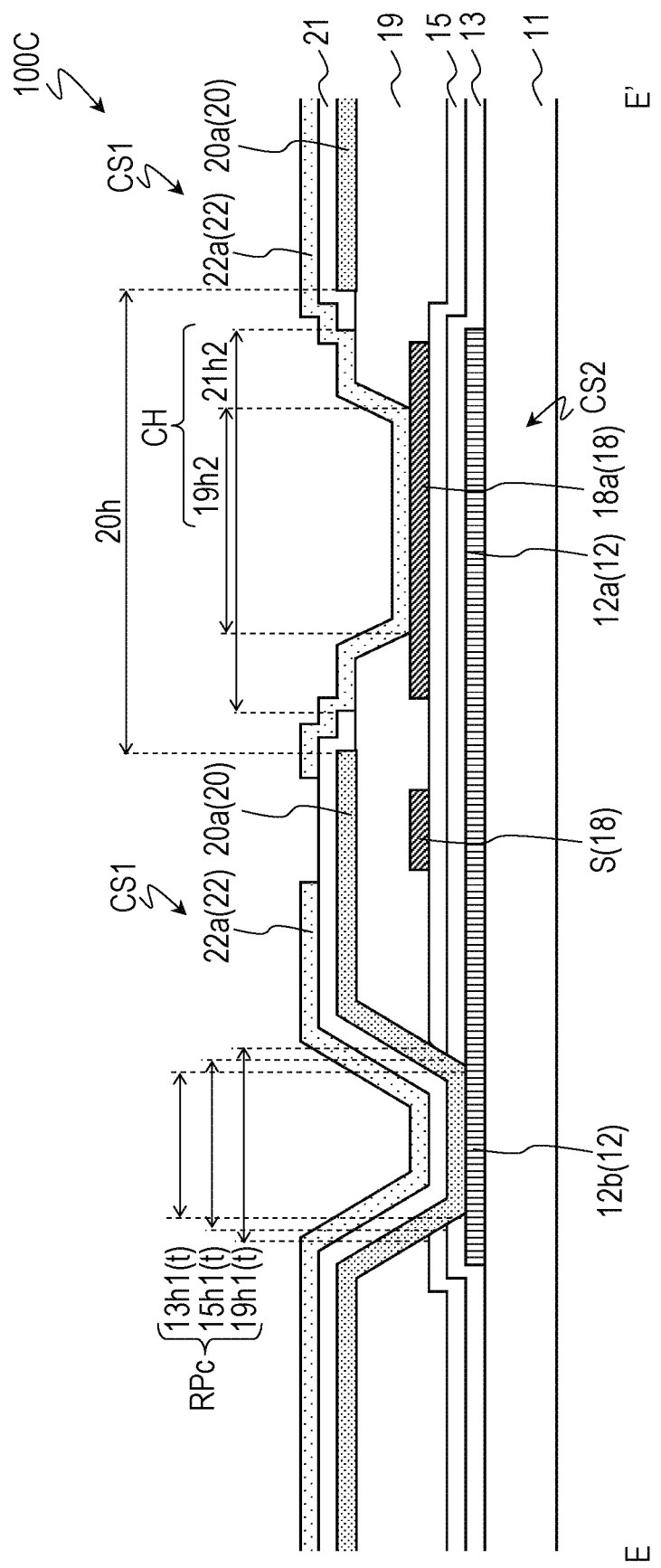
FIG. 22 is a sectional view schematically showing the active matrix substrate 100C, and shows a sectional structure taken along the line E-E' in FIG. 21.
Figure 23:
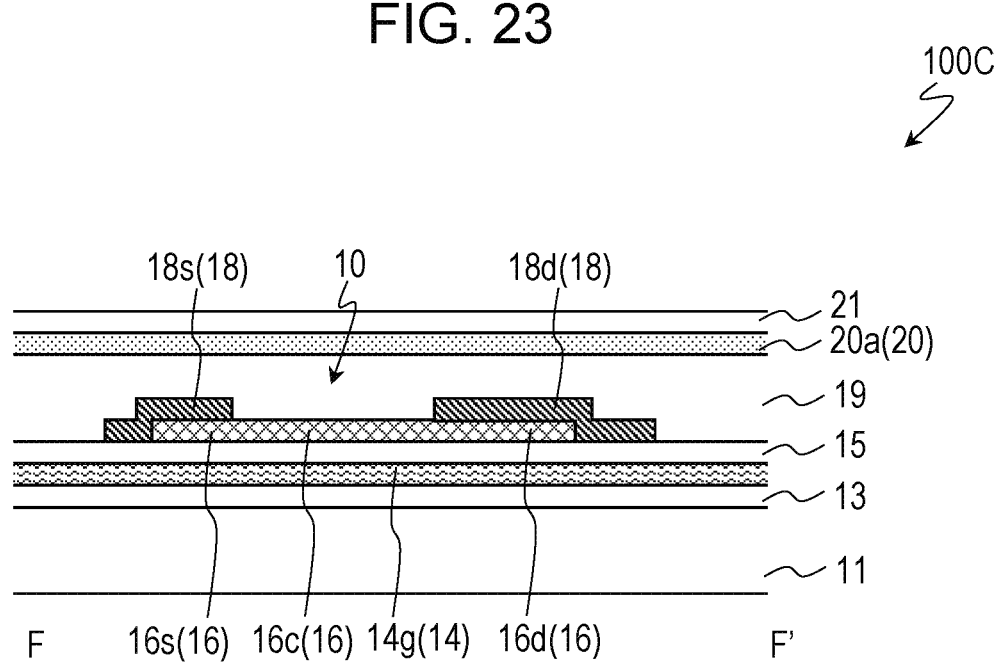
FIG. 23 is a sectional view schematically showing the active matrix substrate 100C, and shows a sectional structure taken along the line F-F' in FIG. 21.
Figure 24:
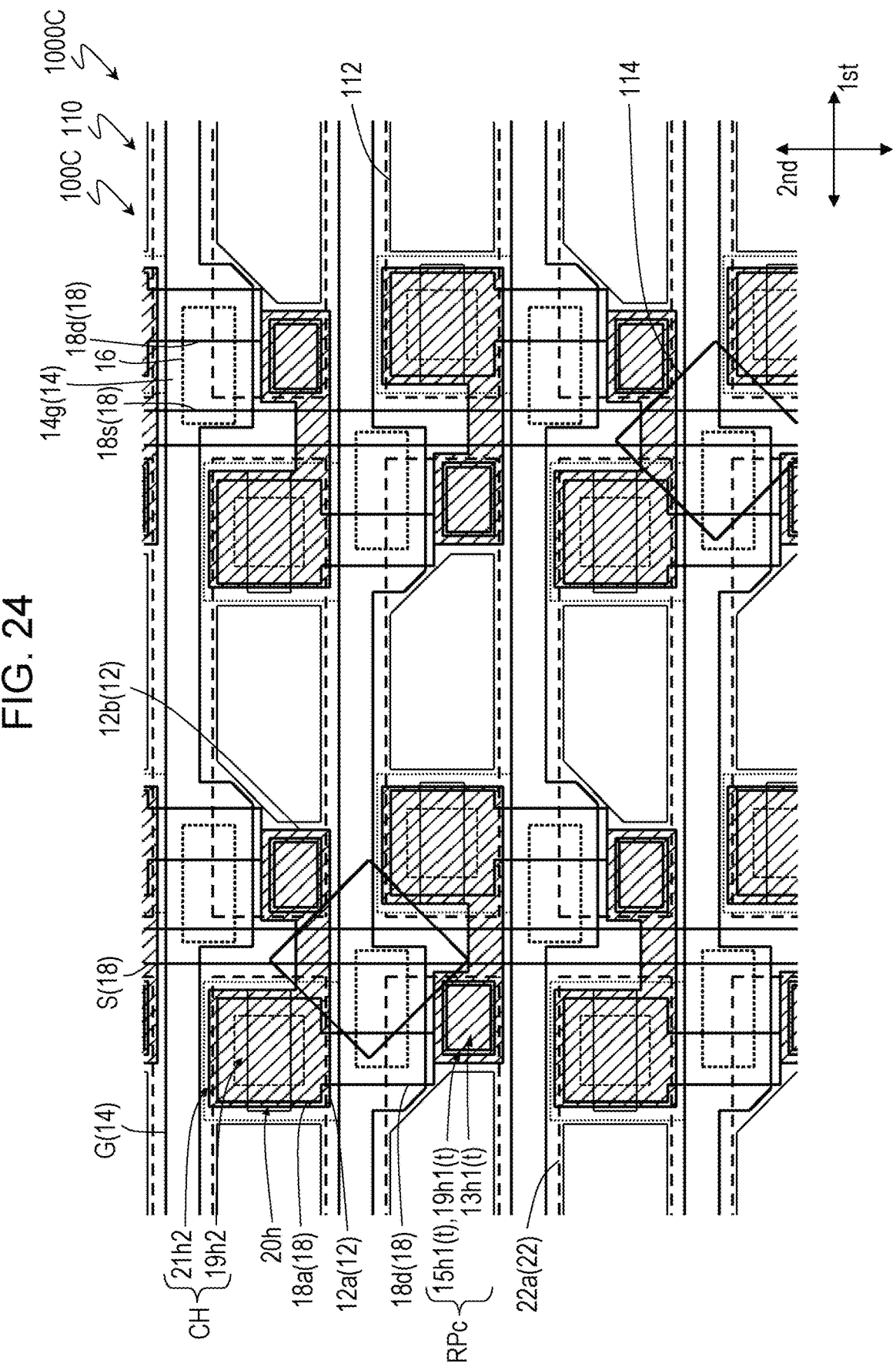
FIG. 24 is a plan view schematically showing a liquid crystal display device 1000C including the active matrix substrate 100C.

FIGS. 21, 22, 23, and 24 show an active matrix substrate 100C and a liquid crystal display device 1000C including the active matrix substrate 100C in the present embodiment. FIG. 21 is a plan view schematically showing the active matrix substrate 100C, FIGS. 22 and 23 are sectional views schematically showing the active matrix substrate 100C, and FIG. 24 is a plan view schematically showing the liquid crystal display device 1000C. The liquid crystal display device 1000C includes the active matrix substrate 100C, the counter substrate 110, and the liquid crystal layer (not shown). FIG. 21 is a view in which the lower metal layer 12 is hatched. FIG. 22 shows a sectional structure taken along the line E-E' in FIG. 21, and FIG. 23 shows a sectional structure taken along the line F-F' in FIG. 21. The following description will focus on the differences between the active matrix substrate 100C and the active matrix substrate 100A in Embodiment 1.

The active matrix substrate 100C further has the lower metal layer 12 formed below the gate metal layer 14 and the lower insulating layer 13 formed between the gate metal layer 14 and the lower metal layer 12.

Each of the plurality of pixels further has an auxiliary capacitor electrode 12a. The auxiliary capacitor electrode 12a includes the lower metal layer 12, is electrically connected to the first transparent electrode 20a, and overlaps the drain extension section 18a when viewed in a normal direction of the substrate 11. Here, the auxiliary capacitor electrode 12a is included in the lower metal layer 12. The auxiliary capacitor electrode 12a is opposite the drain extension section 18a with the lower insulating layer 13 and the gate insulating layer 15 interposed therebetween, and the auxiliary capacitor electrode 12a and the drain extension section 18a, and the lower insulating layer 13 and the gate insulating layer 15 positioned therebetween constitute an auxiliary capacitor CS2. The auxiliary capacitor CS2 may be formed even when the auxiliary capacitor electrode 12a and the drain extension section 18a do not overlap when viewed in a normal direction of the substrate 11.

In addition to the auxiliary capacitor CS1, the active matrix substrate 100C has the auxiliary capacitor CS2 as an auxiliary capacitor formed to be electrically connected to the liquid crystal capacitor of each pixel P, and therefore the auxiliary capacitance value that can be secured compared to that of the active matrix substrate 100A is large. Therefore, the display quality of the liquid crystal display device including the active matrix substrate 100C can be more effectively improved.

According to the present inventor's trial calculation, when the thickness of the gate insulating layer 15 (silicon nitride) is 410 nm and the thickness of the lower insulating layer 13 (silicon nitride) is 410 nm, the sum of the capacitance value of the auxiliary capacitor CS1 and the auxiliary capacitor CS2 of the active matrix substrate 100C is increased by about 26 points as compared with the capacitance value of the auxiliary capacitor CS1 of the active matrix substrate 100A, and is increased by 37 points as compared with the case where a recess RPc is not formed. Here, an angle of the side surface of the recess RPc to the surface parallel to the substrate was estimated to be about 76.5°.

The auxiliary capacitor electrode 12a is formed to overlap the drain extension section 18a. Since the auxiliary capacitor electrode 12a is mainly provided in a region not contributing to the display (here, a region overlapping the drain extension section 18a), the decrease in the aperture ratio due to the provision of the auxiliary capacitor electrode 12a is suppressed. The active matrix substrate 100C can improve the display quality of the liquid crystal display device while suppressing the decrease in the aperture ratio of the liquid crystal display device.

The auxiliary capacitor electrode 12a is electrically connected to the first transparent electrode 20a by, for example, the following method. The lower metal layer 12 further has a portion 12b electrically connected to the auxiliary capacitor electrode 12a. Here, the portion 12b extends across the source bus line S from the auxiliary capacitor electrode 12a. Each of the plurality of pixels further has the recess RPc. The recess RPc is constituted by the hole $19h1(t)$ formed in the interlayer insulating layer 19, the hole $15h1(t)$ formed in the gate insulating layer 15, and a hole $13h1(t)$ formed in the lower insulating layer 13 and reaches the portion 12b. The first transparent electrode 20a is in contact with the portion 12b in the recess RPc. The portion 12b overlaps the hole $13h1(t)$ formed in the lower insulating layer 13 when viewed in a normal direction of the substrate 11.

The active matrix substrate 100C has the two-layer electrode structure and each pixel is provided with the recess RPc. Furthermore, in each pixel, the recess RPc is formed adjacent to the TFT 10. Since the region around the TFT 10 is often covered with the light shielding layer (black matrix), a decrease in aperture ratio due to the provision of the recess RPc is suppressed. The active matrix substrate 100C can secure the auxiliary capacitance value while suppressing the decrease in the aperture ratio of the liquid crystal display device. Therefore, the active matrix substrate 100C can improve the display quality while suppressing the decrease in the aperture ratio of the liquid crystal display device.

The lower metal layer 12 is formed below the gate metal layer 14. The lower metal layer 12 may have the single-layer structure or the stacked structure in which the plurality of layers are stacked. The lower metal layer 12 includes at least a layer formed of the metal material. In a case where the lower metal layer 12 has the stacked structure, some layers may be formed of the metal nitride or the metal oxide. The lower metal layer 12 is formed of, for example, any of the metal such as aluminum (Al), tungsten (W), molybdenum (Mo), tantalum (Ta), chromium (Cr), titanium (Ti), and copper (Cu), the alloy containing the above-described metal, and the nitride thereof.

The lower insulating layer 13 is formed between the lower metal layer 12 and the gate metal layer 14. The lower insulating layer 13 is formed of an inorganic insulation material. The lower insulating layer 13 is, for example, a silicon oxide (SiOx) film, a silicon nitride (SixNy) film, a silicon oxynitride (SiOxNy; x>y) film, a silicon nitride oxide (SiNxOy; x>y) film, or the stacked film thereof.

Although the auxiliary capacitor electrode 12a is included in the lower metal layer 12 in the illustrated example, the auxiliary capacitance electrode may include the lower metal layer 12 and the gate metal layer 14. In particular, when an auxiliary capacitor is constituted by the gate metal layer 14 of the auxiliary capacitor electrode, the drain extension section 18a, and the gate insulating layer 15 positioned therebetween instead of the storage capacitor CS2, the thickness of the dielectric layer constituting the auxiliary capacitor can be reduced. Accordingly, the auxiliary capacitance value can be increased. From the viewpoint of increasing the auxiliary capacitance value, in the auxiliary capacitor electrodes, it is preferable that the portion overlapping the drain extension section 18a when viewed in a normal direction of the substrate 11 includes the gate metal layer 14. In this case, since the thickness of the dielectric layer constituting the auxiliary capacitor can be at least partially reduced, the auxiliary capacitance value can be increased. Furthermore, in the illustrated example, the auxiliary capacitor electrode 12a and the portion 12b connected to the auxiliary capacitor electrode 12a are included in the lower metal layer 12, but the lower metal layer 12 and the lower insulating layer 13 can be omitted by forming the auxiliary capacitor electrode 12a and the portion 12b in the gate metal layer 14.

Note that, when the auxiliary capacitor electrode includes the gate metal layer 14, the following problem may occur. When the gap between the auxiliary capacitor electrode formed in the gate metal layer 14 and the gate bus line G is small, the manufacturing yield may be reduced. When the liquid crystal display device having the active matrix substrate of the present embodiment is set as a 2.6 type (2.6 inch) full high definition (FHD) panel, the pixel pitch in the row direction (Px in FIG. 1) is 30 μm, and the pixel pitch in the column direction (Py in FIG. 1) is 10 μm. At this time, the distance between the auxiliary capacitor electrode formed in the gate metal layer 14 and the gate bus line G is, for example, about 0.5 μm at the smallest location. In consideration of the conditions generally used in the photolithography process or the resolution (minimum dimension of the pattern which can be formed) in the apparatus, in such a case, the manufacturing yield may be reduced.

Embodiment 4

The active matrix substrate of the present embodiment includes an oxide semiconductor TFT (a TFT using an oxide semiconductor layer as the active layer) and a crystalline silicon TFT (a TFT using a crystalline silicon layer as the active layer) formed on the same substrate.

The active matrix substrate of the present embodiment has, for the TFT (sometimes referred to as a "pixel TFT") of each pixel, for example, an oxide semiconductor TFT having an In—Ga—Zn—O-based semiconductor film as an active layer. A part or the whole of a peripheral drive circuit is integrally formed on the same substrate as the pixel TFT. Such an active matrix substrate is referred to as a driver monolithic active matrix substrate. In the driver monolithic active matrix substrate, the peripheral drive circuit is provided in the region (the non-display region or the picture-frame region) other than the region (the display region) including the plurality of pixels. For example, a crystalline silicon TFT having a polycrystalline silicon film as an active layer is used for a TFT (sometimes referred to as a "circuit TFT") constituting the peripheral drive circuit. As described above, when the oxide semiconductor TFT is used for the pixel TFT and the crystalline silicon TFT is used for the circuit TFT, the power consumption can be small in the display region, and furthermore, the picture-frame region can be small.

Figure 25:
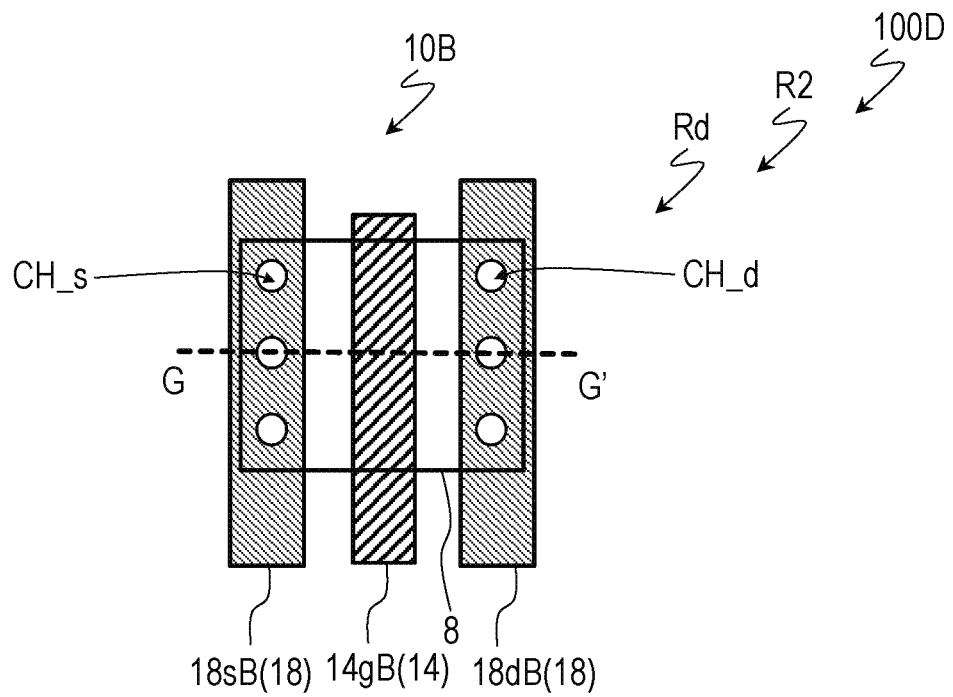
FIG. 25 is a schematic plan view of a non-display region R2 of an active matrix substrate 100D according to Embodiment 4 of the present invention.
Figure 26:
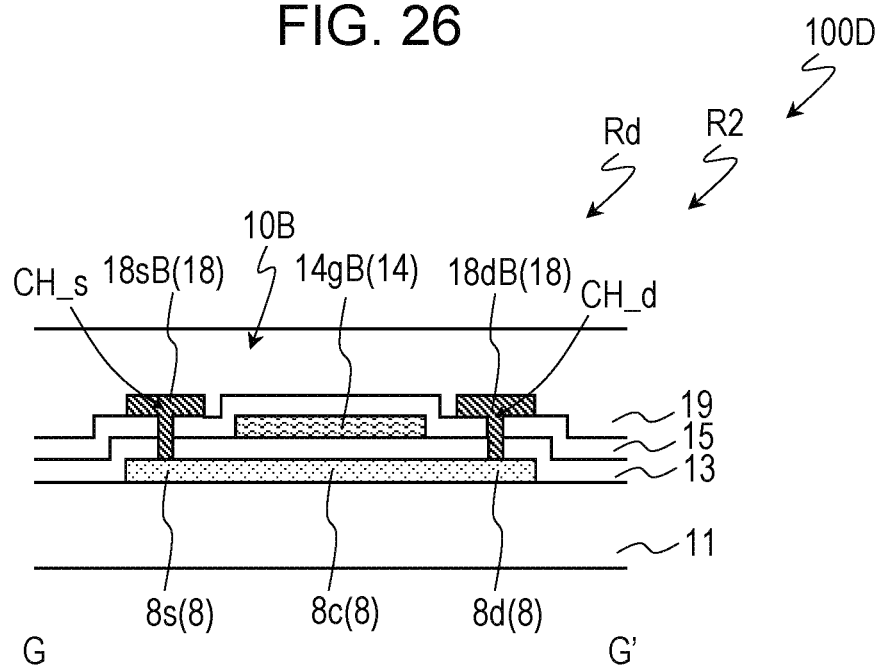
FIG. 26 is a schematic sectional view of the non-display region R2 of the active matrix substrate 100D, and shows a sectional structure taken along the line G-G' in FIG. 25.

FIGS. 25 and 26 show an active matrix substrate 100D of the present embodiment. FIGS. 25 and 26 are respectively a schematic plan view and a schematic sectional view of a non-display region R2 of the active matrix substrate 100D. FIG. 26 shows a sectional structure taken along the line G-G' in FIG. 25.

A display region R1 of the active matrix substrate 100D has basically the same structure as the display region R1 of the active matrix substrate 100C of Embodiment 3 described with reference to FIGS. 21, 22, and 23. However, the TFT 10 (pixel TFT 10) included in each pixel P is an oxide semiconductor TFT. In the description of the display region of the active matrix substrate 100D, references may be made to FIGS. 21, 22, and 23.

As shown in FIGS. 25 and 26, the non-display region R2 of the active matrix substrate 100D includes a drive circuit formation region Rd in which the drive circuit is provided. For example, a gate driver circuit, an inspection circuit, and the like are provided in the drive circuit formation region Rd.

As shown in FIGS. 25 and 26, in the active matrix substrate 100D, a crystalline silicon TFT 10B (hereinafter sometimes referred to as a "second thin film transistor 10B") is formed as a circuit TFT 10B in the drive circuit formation region Rd. In each pixel of the display region R1 of the active matrix substrate 100D, an oxide semiconductor TFT 10 (hereinafter sometimes referred to as a "first thin film transistor 10") is formed as the pixel TFT 10.

The active matrix substrate 100D includes a substrate 11, the first thin film transistor 10 formed on the substrate 11, and the second thin film transistor 10B formed on the substrate 11. The second thin film transistor 10B has an active region mainly including the crystalline silicon. The first thin film transistor 10 has an active region mainly including the oxide semiconductor. The second thin film transistor 10B and the first thin film transistor 10 are integrally formed on the substrate 11. Here, the "active region" refers to a region in which a channel is formed in the semiconductor layer to be the active layer of the TFT.

As shown in FIG. 26, the second thin film transistor 10B includes a crystalline silicon semiconductor layer (for example, a low temperature polysilicon layer) 8 formed on the substrate 11, and the lower insulating layer 13 covering the crystalline silicon semiconductor layer 8, a gate electrode 14gB provided on the lower insulating layer 13 and formed to overlap the crystalline silicon semiconductor layer 8 with the lower insulating layer 13 therebetween, and the insulating layer 15 (the gate insulating layer 15) covering the gate electrode 14gB, and a source electrode 18sB and a drain electrode 18dB connected to the crystalline silicon semiconductor layer 8.

The crystalline silicon semiconductor layer 8 has a region (referred to as an "active region" or a "channel region") 8c in which the channel is formed, and a source region 8s and a drain region 8d positioned on both sides of the active region. The active region 8c is a portion overlapping the gate electrode 14gB with the lower insulating layer 13 interposed therebetween, in the crystalline silicon semiconductor layer 8 of this example.

In the lower insulating layer 13, a portion positioned between the crystalline silicon semiconductor layer 8 and the gate electrode 14gB functions as a gate insulation film of the second thin film transistor 10B.

The gate electrode 14gB is included in the gate metal layer 14.

The source electrode 18sB and the drain electrode 18dB are included in the source metal layer 18. The source electrode 18sB and the drain electrode 18dB are respectively connected to the source region 8s and the drain region 8d. The source electrode 18sB and the drain electrode 18dB may be provided on the interlayer insulation film (here, the gate insulating layer 15) covering the gate electrode 14gB and the crystalline silicon semiconductor layer 8, so as to be connected to the crystalline silicon semiconductor layer 8 in contact holes CH_s and CH_d formed on the interlayer insulation film (the gate insulating layer 15) and the lower insulating layer 13.

The second thin film transistor 10B is covered with the interlayer insulating layer 19. The inorganic insulating layer 21 may be formed on the second thin film transistor 10B.

The first thin film transistor 10 has the same structure as the pixel TFT 10 of the active matrix substrate 100C shown in FIG. 23, and thus the description is omitted.

In the illustrated example, the second thin film transistor 10B has a top gate structure in which the crystalline silicon semiconductor layer 8 is disposed between the gate electrode 14gB and the substrate 11. Meanwhile, the first thin film transistor 10 has a bottom gate structure in which the gate electrode 14g is disposed between the oxide semiconductor layer 16 and the substrate 11. By adopting such a structure, when the two types of the thin film transistors 10 and 10B are integrally formed on the same substrate 11, the increase in the number of manufacturing steps and the manufacturing cost can be more effectively suppressed.

The TFT structures of the second thin film transistor 10B and the first thin film transistor 10 are not limited to the above description. For example, the second thin film transistor 10B may further have the gate electrode included in the lower metal layer 12 (the double gate structure).

The gate insulating layer 15 which is the gate insulation film of the first thin film transistor 10 may extend to a region where the second thin film transistor 10B is formed, so as to function as the interlayer insulation film covering the gate electrode 14gB of the second thin film transistor 10B and the crystalline silicon semiconductor layer 8. In this way, in a case where the interlayer insulation film of the second thin film transistor 10B and the gate insulation film of the first thin film transistor 10 are formed in the same layer (here, the gate insulating layer 15), the gate insulating layer 15 may have the stacked structure.

Here, the gate electrode 14gB of the second thin film transistor 10B and the gate electrode 14g of the first thin film transistor 10 are formed in the same layer (in the gate metal layer 14). In addition, here, the source electrode 18sB and the drain electrode 18dB of the second thin film transistor 10B, and the source electrode 18s and the drain electrode 18d of the first thin film transistor 10 are formed in the same layer (in the source metal layer 18). The expression "formed in the same layer" means a case of being formed using the same film (the conductive film). Accordingly, the increase in the number of manufacturing processes and in the manufacturing cost can be suppressed.

The active matrix substrate 100D has the two-layer electrode structure and each pixel is provided with the recess RPc. Furthermore, in each pixel, the recess RPc is formed adjacent to the TFT 10. Since the region around the TFT 10 is often covered with the light shielding layer (black matrix), a decrease in aperture ratio due to the provision of the recess RPc is suppressed. The active matrix substrate 100D can secure the auxiliary capacitance value while suppressing the decrease in the aperture ratio of the liquid crystal display device. Therefore, the active matrix substrate 100D can improve the display quality while suppressing the decrease in the aperture ratio of the liquid crystal display device.

In addition to the auxiliary capacitor CS1, the active matrix substrate 100D has the auxiliary capacitor CS2 as an auxiliary capacitor formed to be electrically connected to the liquid crystal capacitor of each pixel P, and therefore the auxiliary capacitance value that can be secured compared to that of the active matrix substrate 100A is large. Therefore, the display quality of the liquid crystal display device including the active matrix substrate 100D can be more effectively improved. In addition, since the auxiliary capacitor electrode 12a is mainly provided in the region not contributing to display, the active matrix substrate 100D can improve the display quality of the liquid crystal display device while suppressing the decrease in the aperture ratio of the liquid crystal display device.

The active matrix substrate 100D may further have an insulating layer between the substrate 11 and the crystalline silicon semiconductor layer 8. The insulating layer formed between the substrate 11 and the crystalline silicon semiconductor layer 8 may be formed in the display region R1 and the non-display region R2.

The crystalline silicon semiconductor layer 8 may be formed between the lower metal layer 12 and the lower insulating layer 13 or may be formed below the lower metal layer 12.

Modification Example 1

An active matrix substrate of Modification Example 1 of the present embodiment will be described with reference to FIGS. 27, 28, 29, and 30.

Figure 27:
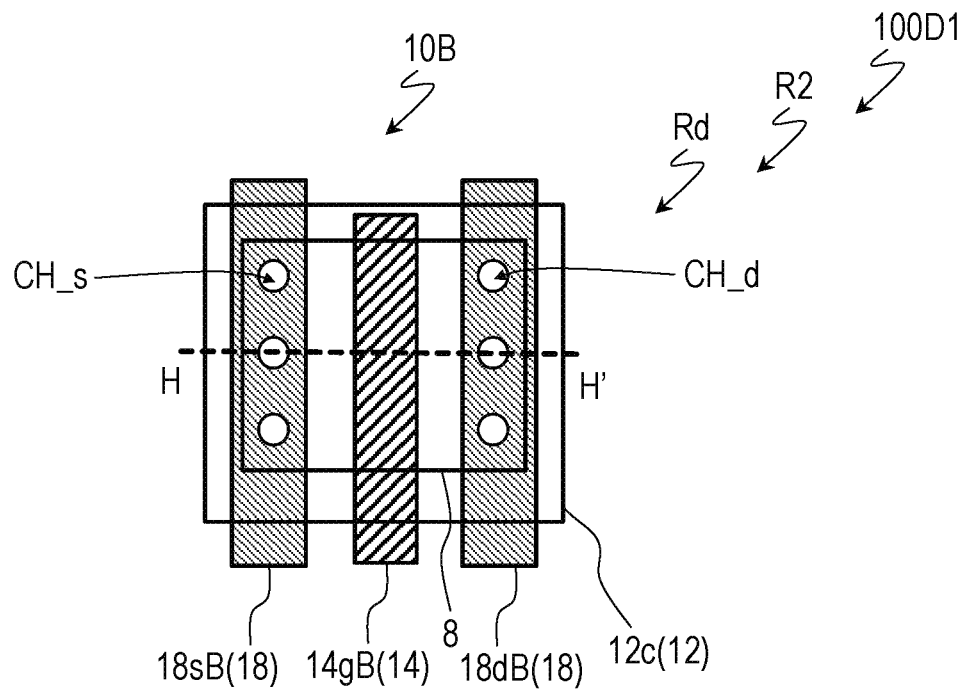
FIG. 27 is a schematic plan view of a non-display region R2 of an active matrix substrate 100D1 according to Modification Example 1 of Embodiment 4 of the present invention.
Figure 28:
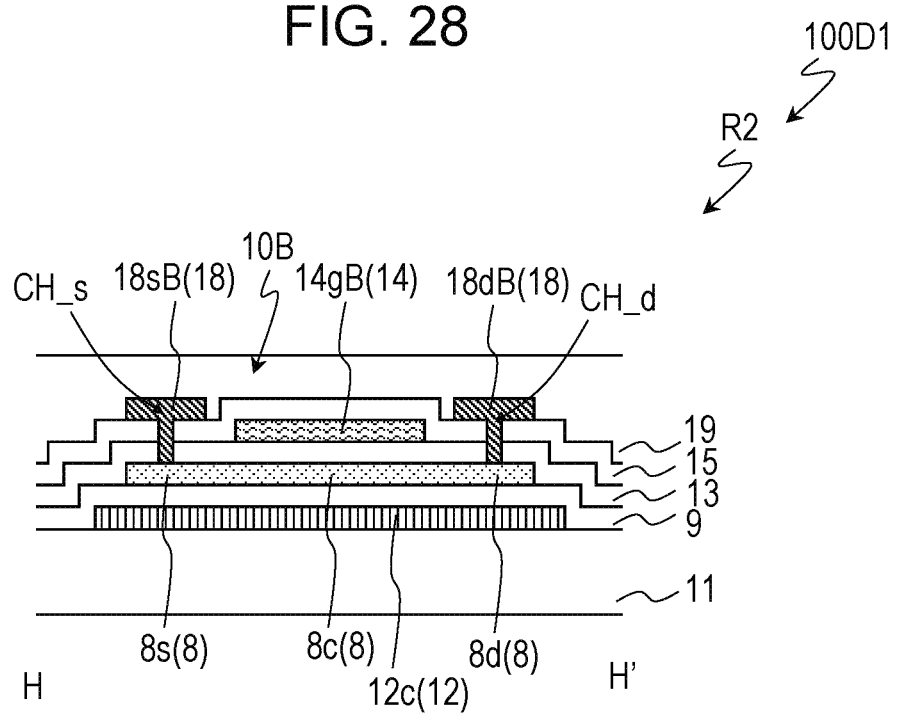
FIG. 28 is a schematic sectional view of the non-display region R2 of the active matrix substrate 100D1, and shows a sectional structure taken along the line H-H' in FIG. 27.
Figure 29:
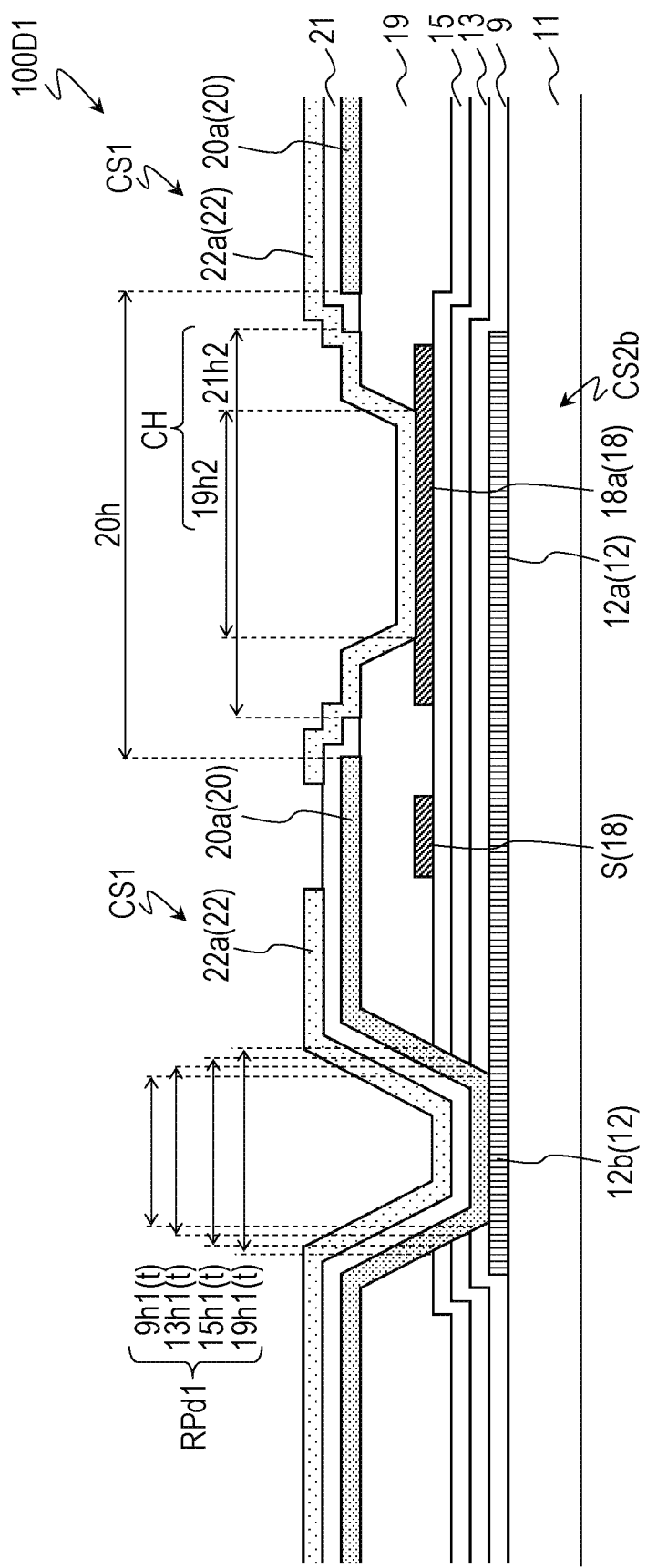
FIG. 29 is a schematic sectional view of a display region R1 of the active matrix substrate 100D1.
Figure 30:
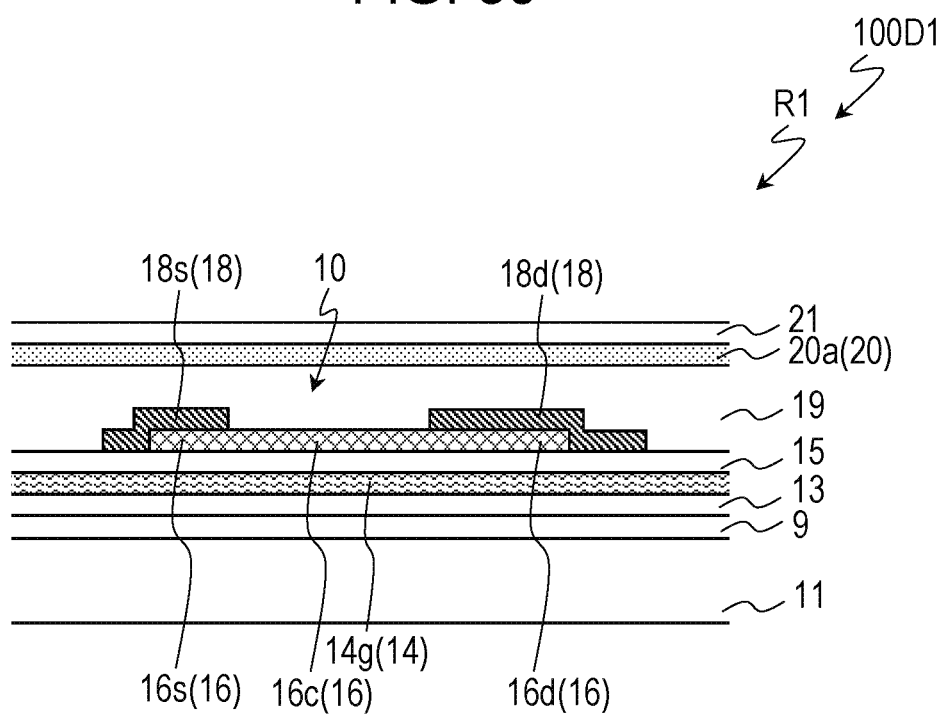
FIG. 30 is a schematic sectional view of the display region R1 of the active matrix substrate 100D1.

FIGS. 27, 28, 29, and 30 show an active matrix substrate 100D1 of Modification Example 1 of the present embodiment. FIGS. 27 and 28 are respectively a schematic plan view and a schematic sectional view of a non-display region R2 of the active matrix substrate 100D1. FIG. 28 shows a sectional structure taken along the line H-H' in FIG. 27. FIGS. 29 and 30 are sectional views schematically showing a display region R1 of the active matrix substrate 100D1.

The active matrix substrate 100D1 further has a lower light shielding section 12c formed to cover the channel region 8c of the crystalline silicon semiconductor layer 8 of the circuit TFT 10B (the second thin film transistor 10B) when viewed in a normal direction of the substrate 11, as shown in FIGS. 27 and 28, which differs from the active matrix substrate 100D. The lower light shielding section 12c is included in the lower metal layer 12 and is formed in an island shape.

Also in the active matrix substrate 100D1 having such a structure, the same effect as that of the active matrix substrate 100D can be obtained.

In the active matrix substrate 100D1, the lower light shielding section 12c functions as a light shielding film of the crystalline silicon semiconductor layer 8, and can restrain the backlight from being incident on the crystalline silicon semiconductor layer 8.

Typically, when light is radiated to the semiconductor layer and is absorbed, electrons are excited in a conduction band and holes are excited in a valence band by a photoelectric effect, and an electron-hole pair is generated. Therefore, when light is radiated to the channel region of the semiconductor layer, photocurrent is generated due to the electron-hole pair, and the leak current of the TFT increases, which causes crosstalk, a decrease in contrast ratio, or the like. In particular, this problem is likely to occur in high resolution liquid crystal display devices. As the high resolution of the liquid crystal display device has been advanced, a pixel aperture ratio (the ratio of the total area of pixel openings in the display region) becomes small, and thus there is a tendency that it becomes difficult to obtain a sufficient display luminance. Therefore, in order to increase the display luminance, the luminance of the backlight is often caused to be increased.

The active matrix substrate 100D1 has the lower light shielding section 12c that functions as the light shielding film of the crystalline silicon semiconductor layer 8, which is the advantage of being able to suppress the occurrence of the above problem.

However, as described below, the second auxiliary capacitor CS2b formed in each pixel of the active matrix substrate 100D1 has a smaller capacitance value than the second auxiliary capacitor CS2 of the active matrix substrate 100D.

The active matrix substrate 100D1 further has an insulating layer 9 formed between the lower insulating layer 13 and the lower metal layer 12. The semiconductor layer 8 is formed between the further insulating layer 9 and the lower insulating layer 13.

The structure of the display region R1 of the active matrix substrate 100D1 will be described with reference to FIGS. 29 and 30.

FIGS. 29 and 30 show sectional structures of the display region R1 of the active matrix substrate 100D1 and are views corresponding to the sectional structure of the display region R1 of active matrix substrate 100C shown in FIGS. 22 and 23, respectively. As shown in FIGS. 29 and 30, the structure of the display region R1 of the active matrix substrate 100D1 has the further insulating layer 9 formed between the lower insulating layer 13 and the lower metal layer 12, which differs from the structure (see FIGS. 22 and 23) of the display region R1 of the active matrix substrate 100D.

In each pixel of the active matrix substrate 100D1, the auxiliary capacitor electrode 12a and the drain extension section 18a, and the gate insulating layer 15, the lower insulating layer 13, and the further insulating layer 9 positioned therebetween constitute a second auxiliary capacitor CS2b.

The second auxiliary capacitor CS2b has the small auxiliary capacitance value since the thickness of the dielectric layer constituting the auxiliary capacitor is greater than that of the second auxiliary capacitor CS2 of the active matrix substrate 100D.

In addition, in each pixel of the active matrix substrate 100D1, each of the plurality of pixels has a recess RPd1. The recess RPd1 is constituted by the hole 19h1(t) formed in the interlayer insulating layer 19, the hole 15h1(t) formed in the gate insulating layer 15, the hole 13h1(t) formed in the lower insulating layer 13, and a hole 9h1(t) formed in the further insulating layer 9 and reaches the portion 12b. The first transparent electrode 20a is in contact with the portion 12b in the recess RPd1. The portion 12b overlaps the hole 9h1(t) formed in the further insulating layer 9 when viewed in a normal direction of the substrate 11.

Modification Example 2

An active matrix substrate of Modification Example 2 of the present embodiment has the same structure as the active matrix substrate 100D in the display region, which differs from the active matrix substrate 100D1 of Modification Example 1 of the present embodiment. That is, although the non-display region of the active matrix substrate of Modification Example 2 has the further insulating layer 9, the display region does not have the further insulating layer 9.

The non-display region of the active matrix substrate of Modification Example 2 has substantially the same structure as those shown in FIGS. 27 and 28, and the display region of the active matrix substrate of Modification Example 2 has substantially the same structure as those shown in FIGS. 22 and 23.

Also in the active matrix substrate having such a structure, the same effect as the active matrix substrate 100D and the active matrix substrate 100D1 can be obtained.

The active matrix substrate of Modification Example 2 can form the second auxiliary capacitor having a capacitance value equal to that of the second auxiliary capacitor CS2 of the active matrix substrate 100D, which is advantageous over the active matrix substrate 100D1 of Modification Example 1.

INDUSTRIAL APPLICABILITY

According to the embodiments of the present invention, it is possible to improve the display quality while suppressing the decrease in the aperture ratio of the liquid crystal display device. The active matrix substrate and the liquid crystal display device according to the embodiments of the present invention are suitably used, for example, in the high resolution liquid crystal display device.

REFERENCE SIGNS LIST 8 semiconductor layer
8c channel region (active region)
8d drain region
8s source region
9 insulating layer
10 TFT (pixel TFT) (first thin film transistor)
10B circuit TFT (second thin film transistor)
11 substrate
12 lower metal layer
12a auxiliary capacitor electrode
12c lower light shielding section
13 lower insulating layer
13h1 hole
14 gate metal layer
14g, 14gB gate electrode
15 gate insulating layer
15h1, 15h1A, 15h1B hole
16 semiconductor layer
16c channel region (active region)
16d drain region
16s source region
18 source metal layer
18a drain extension section
18d, 18dB drain electrode
18s, 18sB source electrode
19 interlayer insulating layer
19h1, 19h1A, 19h1B hole
20 first transparent conductive layer
20a first transparent electrode (common electrode)
20h opening
21 inorganic insulating layer
21h2 opening
22 second transparent conductive layer
22a second transparent electrode (pixel electrode)
24 upper metal layer
100A active matrix substrate
100A1, 100A2, 100A3, 100A4 active matrix substrate
100B, 100B1, 100B2 active matrix substrate
100C, 100D, 100D1 active matrix substrate
500 active matrix substrate
110, 510 counter substrate
112 black matrix
112a first light shielding section
112b second light shielding section
112o opening
114 columnar spacer
120 liquid crystal layer
130a, 130b alignment film
140, 140A, 140B gate driver circuit (gate driver)
150 source driver circuit (source driver)
1000A, 1000A1, 1000C liquid crystal display device
1500 liquid crystal display device
CH contact hole
CS1, CS2, CS2b second auxiliary capacitor
G gate bus line
R1 display region
R2 non-display region
Rd drive circuit formation region
RPa, RPa1, RPa2, RPa3, RPa4A Recess
RPa4B, RPc, RPd1 recess
S source bus line

The invention claimed is:

1. An active matrix substrate that has a plurality of pixels arranged in a matrix having a plurality of rows and a plurality of columns, the active matrix substrate comprising:
a plurality of first TFTs each associated with any one of the plurality of pixels;
a plurality of gate bus lines each extending in a first direction;
a plurality of source bus lines each extending in a second direction different from the first direction,
the plurality of pixels constituting a plurality of color display pixels, each of the plurality of color display pixels including at least three pixels adjacent to one another in the second direction;
a substrate;
a gate metal layer that is supported by the substrate and includes, out of a first gate electrode, a first source electrode, and a first drain electrode included in the plurality of first TFTs, the first gate electrode, and the plurality of gate bus lines;
a gate insulating layer formed on the gate metal layer;
a source metal layer that is formed on the gate insulating layer and includes the first source electrode, the first drain electrode, and the plurality of source bus lines;
an interlayer insulating layer formed on the source metal layer;
a first transparent conductive layer formed on the interlayer insulating layer;
an inorganic insulating layer formed on the first transparent conductive layer; and
a second transparent conductive layer formed on the inorganic insulating layer, wherein
each of the plurality of pixels has
at least one recess including a hole formed in the interlayer insulating layer,
a first transparent electrode that is included in the first transparent conductive layer and is formed on the interlayer insulating layer and in the at least one recess, and
a second transparent electrode that is included in the second transparent conductive layer and is electrically connected to the first drain electrode,
the second transparent electrode is formed along a side surface and a bottom surface of the at least one recess to be opposite the first transparent electrode with the inorganic insulating layer interposed between the second transparent electrode and the first transparent electrode, each of the plurality of pixels further has a contact hole that is formed in the interlayer insulating layer and the inorganic insulating layer and reaches a drain extension section extending from the first drain electrode, and an angle of a side surface of the contact hole to a surface parallel to the substrate is smaller than an angle of the side surface of the at least one recess to the surface parallel to the substrate.

2. The active matrix substrate according to claim 1, further comprising an upper metal layer that is in direct contact with the first transparent conductive layer or the second transparent conductive layer and that contains metal,
wherein the upper metal layer includes a first portion covering the at least one recess when viewed in a normal direction of the substrate.

3. The active matrix substrate according to claim 2,
wherein the upper metal layer further includes a second portion covering a channel region of a semiconductor layer of the first TFT when viewed in a normal direction of the substrate.

4. The active matrix substrate according to claim 1, further comprising:
a lower metal layer formed below the gate metal layer; and
a lower insulating layer formed between the gate metal layer and the lower metal layer,
wherein each of the plurality of pixels further has an auxiliary capacitor electrode that includes the lower metal layer, is electrically connected to the first transparent electrode, and overlaps the drain extension section when viewed in a normal direction of the substrate.

5. The active matrix substrate according to claim 4, wherein
in each of the plurality of pixels, the lower metal includes a third portion that is electrically connected to the auxiliary capacitor electrode, and
the at least one recess further includes a hole formed in the gate insulating layer and a hole formed in the lower insulating layer and reaches the third portion.

6. The active matrix substrate according to claim 4, further comprising a second TFT disposed in a region other than the plurality of pixels,
wherein the second TFT has
a second semiconductor layer formed on the substrate,
the lower insulating layer formed on the second semiconductor layer,
a second gate electrode that is included in the gate metal layer and is formed to overlap the second semiconductor layer with the lower insulating layer interposed between the second gate electrode and the second semiconductor layer,
the gate insulating layer covering the second gate electrode, and
a second source electrode and a second drain electrode that are included in the source metal layer and are connected to the second semiconductor layer.

7. The active matrix substrate according to claim 6,
wherein the lower metal layer further includes a lower light shielding section formed to cover at least a channel region of the second semiconductor layer when viewed in a normal direction of the substrate.

8. The active matrix substrate according to claim 6,
wherein the plurality of first TFTs have a first semiconductor layer formed on the gate insulating layer, the first semiconductor layer includes an oxide semiconductor, and the second semiconductor layer includes crystalline silicon.

9. The active matrix substrate according to claim 1,
wherein the at least one recess is formed adjacent to the first TFT in each of the plurality of pixels.

10. The active matrix substrate according to claim 1,
wherein the interlayer insulating layer includes an organic insulating layer having a thickness of 1 µm to 4 µm.

11. The active matrix substrate according to claim 1,
wherein the angle of the side surface of the at least one recess to the surface parallel to the substrate is 70° or more.

12. The active matrix substrate according to claim 1,
wherein the at least one recess further includes a hole formed in the gate insulating layer.

13. The active matrix substrate according to claim 1,
wherein two pixels, out of the plurality of pixels, adjacent to each other in the second direction are associated with source bus lines, out of the plurality of source bus lines, different from each other.

14. A liquid crystal display device comprising:
the active matrix substrate according to claim 1;
a counter substrate disposed to be opposite the active matrix substrate; and
a liquid crystal layer provided between the active matrix substrate and the counter substrate.

15. The liquid crystal display device according to claim 14,
wherein the second transparent electrode functions as a pixel electrode, and the counter substrate has a counter electrode opposite the second transparent electrode.

16. The liquid crystal display device according to claim 14,
wherein the second transparent electrode has at least one slit, the second transparent electrode functions as a pixel electrode, and the first transparent electrode functions as a common electrode.

17. An active matrix substrate that has a plurality of pixels arranged in a matrix having a plurality of rows and a plurality of columns, the active matrix substrate comprising:
a plurality of first TFTs each associated with any one of the plurality of pixels;
a plurality of gate bus lines each extending in a first direction;
a plurality of source bus lines each extending in a second direction different from the first direction,
the plurality of pixels constituting a plurality of color display pixels, each of the plurality of color display pixels including at least three pixels adjacent to one another in the second direction;
a substrate;
a gate metal layer that is supported by the substrate and includes, out of a first gate electrode, a first source electrode, and a first drain electrode included in the plurality of first TFTs, the first gate electrode, and the plurality of gate bus lines;
a gate insulating layer formed on the gate metal layer;
a source metal layer that is formed on the gate insulating layer and includes the first source electrode, the first drain electrode, and the plurality of source bus lines;
an interlayer insulating layer formed on the source metal layer;
a first transparent conductive layer formed on the interlayer insulating layer;
an inorganic insulating layer formed on the first transparent conductive layer;

a second transparent conductive layer formed on the inorganic insulating layer; and an upper metal layer that is in direct contact with the first transparent conductive layer or the second transparent conductive layer and that contains metal, wherein each of the plurality of pixels has:
- at least one recess including a hole formed in the interlayer insulating layer,
- a first transparent electrode that is included in the first transparent conductive layer and is formed on the interlayer insulating layer and in the at least one recess, and
- a second transparent electrode that is included in the second transparent conductive layer and is electrically connected to the first drain electrode, the second transparent electrode is formed along a side surface and a bottom surface of the at least one recess to be opposite the first transparent electrode with the inorganic insulating layer interposed between the second transparent electrode and the first transparent electrode, each of the plurality of pixels further includes a contact hole that is formed in the interlayer insulating layer and the inorganic insulating layer and reaches a drain extension section extending from the first drain electrode, the upper metal layer includes a first portion covering the at least one recess when viewed in a normal direction of the substrate, and the upper metal layer is in direct contact with the first transparent conductive layer and does not overlap the contact hole when viewed in the normal direction of the substrate.

18. The active matrix substrate according to claim 17, further comprising:

a lower metal layer formed below the gate metal layer; and a lower insulating layer formed between the gate metal layer and the lower metal layer, wherein each of the plurality of pixels further has an auxiliary capacitor electrode that includes the lower metal layer, is electrically connected to the first transparent electrode, and overlaps the drain extension section when viewed in a normal direction of the substrate.

19. The active matrix substrate according to claim 18, wherein in each of the plurality of pixels, the lower metal includes a third portion that is electrically connected to the auxiliary capacitor electrode, and the at least one recess further includes a hole formed in the gate insulating layer and a hole formed in the lower insulating layer and reaches the third portion.

20. The active matrix substrate according to claim 18, further comprising a second TFT disposed in a region other than the plurality of pixels, wherein the second TFT includes:
- a second semiconductor layer formed on the substrate,
- the lower insulating layer formed on the second semiconductor layer,
- a second gate electrode that is included in the gate metal layer and is formed to overlap the second semiconductor layer with the lower insulating layer interposed between the second gate electrode and the second semiconductor layer,
- the gate insulating layer covering the second gate electrode, and
- a second source electrode and a second drain electrode that are included in the source metal layer and are connected to the second semiconductor layer.

* * * * *